United States Patent
Kanda

(10) Patent No.: US 11,021,631 B2
(45) Date of Patent: Jun. 1, 2021

(54) AQUEOUS COATING COMPOSITION

(71) Applicant: KANSAI PAINT CO., LTD., Hyogo (JP)

(72) Inventor: Takashi Kanda, Kanagawa (JP)

(73) Assignee: KANSAI PAINT CO., LTD., Hyogo (JP)

( * ) Notice: Subject to any disclaimer, the term of this patent is extended or adjusted under 35 U.S.C. 154(b) by 211 days.

(21) Appl. No.: 16/085,179

(22) PCT Filed: Mar. 16, 2017

(86) PCT No.: PCT/JP2017/010712
§ 371 (c)(1),
(2) Date: Sep. 14, 2018

(87) PCT Pub. No.: WO2017/164072
PCT Pub. Date: Sep. 28, 2017

(65) Prior Publication Data
US 2019/0077985 A1 Mar. 14, 2019

(30) Foreign Application Priority Data
Mar. 22, 2016 (JP) .............................. JP2016-057128

(51) Int. Cl.
| | | |
|---|---|---|
| *B05D 1/36* | (2006.01) | |
| *B05D 7/24* | (2006.01) | |
| *C09D 5/02* | (2006.01) | |
| *C09D 7/63* | (2018.01) | |
| *C09D 175/14* | (2006.01) | |
| *C09D 175/04* | (2006.01) | |
| *C09D 133/14* | (2006.01) | |
| *C09D 133/00* | (2006.01) | |
| *C09D 167/00* | (2006.01) | |
| *C09D 171/02* | (2006.01) | |
| *C09D 7/40* | (2018.01) | |
| *C09D 133/06* | (2006.01) | |
| *C09D 201/00* | (2006.01) | |
| *C08K 5/00* | (2006.01) | |
| *C08K 5/053* | (2006.01) | |
| *C08K 5/103* | (2006.01) | |

(52) U.S. Cl.
CPC ............. *C09D 175/14* (2013.01); *B05D 1/36* (2013.01); *B05D 7/24* (2013.01); *C08K 5/0025* (2013.01); *C08K 5/053* (2013.01); *C08K 5/103* (2013.01); *C09D 5/02* (2013.01); *C09D 5/022* (2013.01); *C09D 7/40* (2018.01); *C09D 7/63* (2018.01); *C09D 133/00* (2013.01); *C09D 133/066* (2013.01); *C09D 133/14* (2013.01); *C09D 167/00* (2013.01); *C09D 171/02* (2013.01); *C09D 175/04* (2013.01); *C09D 201/00* (2013.01)

(58) Field of Classification Search
None
See application file for complete search history.

(56) References Cited

U.S. PATENT DOCUMENTS

| | | | | |
|---|---|---|---|---|
| 4,624,994 A | * | 11/1986 | Ansel | ..................... C08F 283/00 522/96 |
| 2004/0249061 A1 | | 12/2004 | Sunkara et al. | |
| 2012/0305862 A1 | | 12/2012 | Kasahara et al. | |
| 2015/0064476 A1 | * | 3/2015 | Kanda | .................. C08G 18/423 428/423.1 |
| 2017/0369732 A1 | * | 12/2017 | Takayama | ................ C09D 7/61 |

FOREIGN PATENT DOCUMENTS

| | | |
|---|---|---|
| JP | 2003-96264 | 4/2003 |
| JP | 2003-321648 | 11/2003 |
| JP | 2011-530393 | 12/2011 |
| JP | 2013-213151 | 10/2013 |
| JP | 2014-125558 | 7/2014 |
| JP | 2014-169434 | 9/2014 |
| WO | 2010/018872 | 2/2010 |
| WO | 2011/096480 | 8/2011 |

OTHER PUBLICATIONS

Extended European Search Report dated Oct. 14, 2019 in corresponding European Patent Application No. 17770114.1.
International Search Report dated May 23, 2017 in International (PCT) Application No. PCT/JP2017/010712.

* cited by examiner

*Primary Examiner* — Sheeba Ahmed
(74) *Attorney, Agent, or Firm* — Wenderoth, Lind & Ponack, L.L.P.

(57) ABSTRACT

The present invention provides the following aqueous coating composition. The aqueous coating composition comprises resin particles (A) having an average particle diameter of 300 to 1000 nm, a polyoxyalkylene group-containing polyol (B) having a number average molecular weight of 300 to 2000 and/or a diester compound (C), and a crosslinking agent (D); wherein the total solids content of the polyoxyalkylene group-containing polyol (B) and the diester compound (C) is 5 to 25 mass % based on the total solids content of the resin particles (A), the polyoxyalkylene group-containing polyol (B), the diester compound (C), and the crosslinking agent (D).

16 Claims, No Drawings

AQUEOUS COATING COMPOSITION

CROSS-REFERENCE TO RELATED APPLICATION

This application claims priority to Japanese Patent Application No. 2016-057128, filed on Mar. 22, 2016, the disclosure of which is incorporated herein by reference in its entirety.

TECHNICAL FIELD

The present invention relates to an aqueous coating composition.

BACKGROUND ART

There has been a demand for the reduction in volatile organic compounds (VOC) released from coating compositions from the viewpoint of global environmental protection, and there have been ongoing rapid shifts from solvent-based coating compositions to aqueous coating compositions in various fields of coating of various industrial products, such as industrial machines, construction machines, steel furniture and closets, automobile exterior panels, and automobile components.

A considerable amount of solvent-based coating compositions were previously used also in automobile coating, and reduction of VOCs released from those coating compositions was an urgent matter. A range of coating compositions used in automobile coating steps for undercoating, intermediate coating, and top coating have shifted from organic-solvent-based coating compositions to aqueous coating compositions, and coating with aqueous coating compositions has become predominant.

Additionally, in order to decrease the environmental load, there has been an approach to shortening the coating step by omitting part of the heat-curing step (mainly omitting the heat-curing step performed after intermediate coating), which used to be performed for each of the intermediate coating film layer and the top coating film layer. Automobile coating performed in such a shortened step is now becoming mainstream.

Further, in aqueous coating compositions, the latent heat of vaporization of water, which is a solvent, is high, and the polarity is also high; therefore, the coating operation width (allowable range of temperature and humidity conditions on which coating operability is established) is narrow. Since energy costs (air-conditioning of the coating booth environment etc.) are required in order to achieve a more appropriate coating environment than that of organic solvent coating compositions, cost reduction for air-conditioning of the coating environment is also required.

In terms of facilities necessary for air-conditioning etc., more energy costs are required for heating in the winter season than cooling in the summer season. Water, which is a solvent, is less likely to be vaporized in a low-temperature environment in the winter season, and such a low-temperature environment is a severe condition for sagging properties in terms of coating operability. Increasing the coating solids content of aqueous coating compositions is regarded as a promising method of improving sagging properties. To reduce environmental impact due to air-conditioning of the coating environment of aqueous coating compositions, the development of higher-solid aqueous coating compositions has also been promoted.

However, due to the increase in the solids concentration of aqueous coating compositions, sagging properties in a low-temperature environment could be improved; nevertheless, there was a problem in that the finished appearance (smoothness etc.) of the coating film was reduced in a high-temperature environment.

Typically, an automobile body, in particular its exterior panel part, is provided with a multilayer coating film composed of an undercoating film excellent in corrosion resistance, an intermediate coating film excellent in smoothness and chipping resistance, and a top coating film excellent in appearance and environmental load resistance, for the purpose of imparting excellent, corrosion resistance and appearance to the body.

Of the coating compositions, intermediate automobile coating compositions, in particular, are required to exhibit excellent chipping resistance (chipping: coating film damage caused by small pebbles on the road being kicked up and hitting the coating film), adhesion to the undercoating film, storage stability, finished appearance, coating workability (popping resistance and sag resistance), etc. The market demands that all of these requirements be met at high levels, with the recent shift into aqueous compositions and even the reduction in environmental load being addressed.

For example, PTL 1 discloses a water-based high-solid thermoset resin composition comprising a high-solid emulsion resin and a curing agent, and having a viscosity of 30 to 10000 mPa·s as measured by an E-type viscometer at 1 rpm (25° C.) and a solids content of 55 to 65 wt. %; wherein the high-solid emulsion resin comprises two types of resin particles having different volume average particle diameters that are obtained by emulsion polymerization of an $\alpha,\beta$-ethylenically unsaturated monomer mixture having a hydroxyl value of 10 to 150 and an acid value of 5 to 50; the first resin particles have a volume average particle diameter larger than that of the second resin particles; the first resin particles have a volume average particle diameter of 0.2 to 1.5 µm; and the second resin particles have a volume average particle diameter of 0.05 to 0.4 µm.

Further, PTL 2 discloses a coating composition comprising an aqueous dispersion containing at least one type of resin particles selected from the group consisting of polyaddition resins, polycondensation resins, addition condensation resins, ring-opening polymerization resins, and addition-polymerization resins; wherein the particles have at least two peaks in a particle size distribution curve; at least one of the two peaks is derived from at least one resin selected from the group consisting of polyaddition resins, polycondensation resins, addition condensation resins, and ring-opening polymerization resins; and the dispersion satisfies one or both of specific conditions (i) and (ii).

CITATION LIST

Patent Literature

PTL 1: JP2003-0962641A
PTL 2: JP2003-321648A

SUMMARY OF INVENTION

Technical Problem

In the compositions disclosed in PTL 1 and PTL 2, sagging properties in a low-temperature (further high-humidity) environment could be improved by increasing the solids concentration; however, the finished appearance (smoothness etc.) of the coating film in a high-temperature (further low-humidity) environment was reduced, and the coating operation width was narrow and insufficient in some cases. Moreover, these compositions sometimes had insufficient coating film performance, such as chipping resistance.

Accordingly, an object of the present invention is to provide a high-solid aqueous coating composition having wide coating operation width, an excellent finished appearance, and excellent coating film performance, such as chipping resistance.

Solution to Problem

The present inventors conducted extensive research to achieve the above object, and consequently found that the above object can be achieved by using an aqueous coating composition comprising resin particles having a specific average particle diameter, a polyoxyalkylene group-containing polyol having a specific number average molecular weight and/or a diester compound, and a crosslinking agent, wherein the total content ratio of the polyoxyalkylene group-containing polyol and the diester compound is adjusted within the specific range. Thus, the present invention has been completed.

Specifically, the present invention includes the following embodiments.

Item 1. An aqueous coating composition comprising resin particles (A) having an average particle diameter of 300 to 1000 nm, a polyoxyalkylene group-containing polyol (B) having a number average molecular weight of 300 to 2000 and/or a diester compound (C), and a crosslinking agent (D);

wherein the diester compound (C) is represented by the following Formula (1):

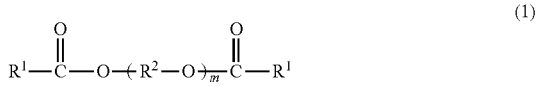

(1)

wherein two $R^1$ are $C_4$-$C_{18}$ hydrocarbon groups that may be the same or different, $R^2$ is a $C_2$-$C_4$ linear or branched alkylene group, m is an integer of 3 to 25, and m oxyalkylene units ($R^2$—O) may be the same or different; and the total solids content of the polyoxyalkylene group-containing polyol (B) and the diester compound (C) is 5 to 25 mass % based on the total solids content of the resin particles (A), the polyoxyalkylene group-containing polyol (B), the diester compound (C), and the crosslinking agent (D).

Item 2. The aqueous coating composition according to Item 1, wherein the resin particles (A) are at least one member selected from the group consisting of acrylic resin particles (A1), urethane resin particles (A2), and acrylic urethane composite resin particles (A3).

Item 3. The aqueous coating composition according to Item 1 or 2, wherein the total solids content of the resin particles (A) is 15 to 50 mass % based on the total solids content of the resin particles (A), the polyoxyalkylene group-containing polyol (B), the diester compound (C), and the crosslinking agent (D).

Item 4. An article having a coating film of the aqueous coating composition according to any one of Items 1 to 3.

Item 5. A method for forming a coating film, the method comprising applying the aqueous coating composition according to any one of Items 1 to 3 to a substrate.

Item 6. A method for forming a multilayer coating film, the method comprising:

(1) applying the aqueous coating composition according to any one of items 1 to 3 to a substrate to form a first base coating film;

(2) applying an aqueous base coating composition to the uncured first base coating film to form a second base coating film;

(3) applying a clear coating composition to the uncured second base coating film to form a clear coating film; and (4) simultaneously curing the uncured first base coating film, second base coating film, and clear coating film by heating.

Advantageous Effects of Invention

The main feature of the aqueous coating composition of the present invention is that it comprises resin particles having an average particle diameter of 300 to 1000 nm, and a polyoxyalkylene group-containing polyol having a number average molecular weight of 300 to 2000 and/or a diester compound.

The average particle diameter of the resin particles is generally larger than that of resin particles used in aqueous coating compositions for automotive applications, for which a high-level finished appearance is required. Resin particles having a large particle diameter have a weak cohesive force between them. Moreover, the volume of spaces between the resin particles dispersed in an aqueous medium increases. Because other coating components having a particle diameter smaller than that of the resin particles can be present in the spaces, a coating composition with a low viscosity as all the constituents in a dispersed state of high-density particles can be obtained; thus, an aqueous coating composition that can be applied at a high solids concentration can be obtained.

Furthermore, because a polyoxyalkylene group-containing polyol having a specific number average molecular weight and having a hydroxyl group as a reactive group is contained as a low-molecular-weight component, the reduction in the leveling properties of the coating film due to the increase in the solids content can be suppressed; thus, a coating film having an excellent finished appearance, such as smoothness, and excellent coating film performance, such as chipping resistance, can be obtained.

Because a diester compound is contained, the dispersibility in aqueous media of hydrophobic components in the aqueous coating composition is particularly improved; thus, it is considered to be possible to obtain an aqueous coating composition further having excellent coating composition storage stability and coating film finished appearance.

Thus, the aqueous coating composition of the present invention has an effect such that a high-solid aqueous coating composition having wide coating operation width, an excellent finished appearance, and excellent coating film performance, such as chipping resistance, can be obtained.

DESCRIPTION OF EMBODIMENTS

The aqueous coating composition of the present invention is described in more detail below.

The aqueous coating composition of the present invention (hereinafter also abbreviated as "the present coating composition") is an aqueous coating composition comprising resin particles (A) having an average particle diameter of 300 to 1000 nm, a polyoxyalkylene group-containing polyol (B) having a number average molecular weight of 300 to 2000 and/or a diester compound (C), and a crosslinking agent (D);

wherein the total solids content of the polyoxyalkylene group-containing polyol (B) and the diester compound (C) is 5 to 25 mass % based on the total solids content of the resin particles (A), the polyoxyalkylene group-containing polyol (B), the diester compound (C), and the crosslinking agent (D).

Resin Particles (A)

The type of resin of the resin particles (A) (also referred to as "the component (A)" in the present specification) is not particularly limited, as long as their average particle diameter is 300 to 1000 nm. Examples of the type of resin include acrylic resins, urethane resins, acrylic urethane composite resins, polyester resins, epoxy resins, and the like.

Acrylic resin particles (A1), urethane resin particles (A2), and acrylic urethane composite resin particles (A3) can be particularly suitably used as the resin particles (A).

It is preferable that the resin particles (A) have a crosslinkable functional group, such as hydroxyl, carboxyl, or epoxy.

The average particle diameter of the resin particles (A) is preferably 300 to 1000 nm, more preferably 350 to 950 nm, and even more preferably 400 to 900 nm, in terms of the increase in the solids content.

The average particle diameter (hereinafter, also referred to as "the particle diameter") can be measured by general measurement means, such as laser light scattering.

In this specification, the average particle diameter of the resin particles refers to a value obtained by measurement at 20° C. using a submicron particle size distribution analyzer after dilution with deionized water according to a usual method. For example, a "COULTER N4" (trade name, produced by Beckman Coulter, Inc.) may be used as the submicron particle size distribution analyzer.

When the resin particles (A) have a hydroxyl group, the hydroxyl value is preferably 1 to 150 mgKOH/g, more preferably 2 to 100 mgKOH/g, and even more preferably 5 to 90 mgKOH/g. Moreover, when the resin particles (A) have an acid group, such as carboxyl, the acid value is preferably 0 to 100 mgKOH/g, more preferably 0 to 50 mgKOH/g, and even more preferably 0 to 30 mgKOH/g.

Moreover, the resin particles (A) may have a core/shell type structure. The "shell portion" refers to a polymeric layer present as the outermost layer of the resin particles, the "core portion" refers to a polymeric layer inside the resin particles other than the shell portion, and the "core/shell type structure" means a structure having the core portion and the shell portion. The core/shell type structure is generally a layered structure in which the core portion is completely covered by the shell portion. However, depending on the mass ratio of the core portion to the shell portion etc., the monomer amount in the shell portion may be insufficient for forming a layered structure. In that case, a complete layered structure as described above is not necessary. A structure in which the shell portion partially covers the core portion, or a structure in which a polymerizable unsaturated monomer that is a constituent of the shell portion is graft-polymerized at a part of the core portion, may be selected. The concept of the multilayer structure in the above core/shell type structure also applies to a case in which the core portion of the resin particles (A) has a multilayer structure. A core/shell type structure can be obtained, for example, by performing a reaction of monomer compositions having different formations at multiple stages.

When the resin particles (A) have an acid group, in order to facilitate dissolution and dispersion in water, it is preferable to perform neutralization using a neutralizer, in terms of improving water dispersibility.

Examples of neutralizers include hydroxides of alkali metals or alkaline earth metals, such as sodium hydroxide, potassium hydroxide, lithium hydroxide, calcium hydroxide, and barium hydroxide; ammonia; primary monoamine compounds, such as ethylamine, propylamine, butylamine, cyclohexylamine, monoethanolamine, isopropanolamine, neopentanolamine, 2-aminopropanol, 3-aminopropanol, and 2-amino-2-methylpropanol; secondary monoamine compounds, such as diethylamine, dibutylamine, diethanolamine, dipropylamine, diisopropanolamine, N-methylethanolamine, N-ethylethanolamine, and N-methylisopropanolamine; tertiary monoamine compounds, such as triethylamine, tributylamine, dimethylethanolamine, diethylethanolamine, methyldiethanolamine, dimethylaminoethanol, and triethanolamine; polyamine compounds, such as ethylenediamine, diethylenetriamine, hydroxyethylaminoethylamine, ethylaminoethylamine, and methylaminopropylamine; pyridine; morpholine; and the like.

Of these, it is preferable to use primary monoamine compounds, secondary monoamine compounds, tertiary monoamine compounds, and polyamine compounds.

The viscosity of a water dispersion of the resin particles (A) is preferably, in terms of ease of handling, 1 to 2000 mPa·s, more preferably 1 to 1000 mPa·s, and even more preferably 1 to 500 mPa·s, as measured by a B-type viscometer (#1, 6 rpm).

Acrylic Resin Particles (A1)

The acrylic resin particles (A1) may be those synthesized by emulsion polymerization or those synthesized by solution polymerization, and both can be used in combination. However, in terms of obtaining resin particles having an average particle diameter of 300 nm to 1000 nm, those synthesized by emulsion polymerization can be suitably used.

Emulsion polymerization can be performed by a conventionally known method, such as a seed polymerization method or a mini-emulsion polymerization method. For example, emulsion polymerization of a polymerizable unsaturated monomer can be performed in the presence of an emulsifier using a polymerization initiator.

More specifically, emulsion polymerization can be performed in such a manner that an emulsifier is dissolved in water or an aqueous medium optionally containing an organic solvent, such as alcohol, and a polymerizable unsaturated monomer and a polymerization initiator are added dropwise under heating and stirring. A polymerizable unsaturated monomer emulsified beforehand using an emulsifier and water can also be added dropwise.

For the emulsifier, anionic emulsifiers and nonionic emulsifier are suitable. Examples of anionic emulsifiers include sodium salts and ammonium salts of alkylsulfonic acids, alkylbenzenesulfonic acids, alkylphosphoric acids, etc. Examples of nonionic emulsifiers include polyoxyethylene oleyl ether, polyoxyethylene stearyl ether, polyoxyethylene lauryl ether, polyoxyethylene tridecyl ether, polyoxyethylene phenyl ether, polyoxyethylene nonylphenyl ether, polyoxyethylene octylphenyl ether, polyoxyethylene monolaurate, polyoxyethylene monostearate, polyoxyethylene monooleate, sorbitan monolaurate, sorbitan monostearate, sorbitan trioleate, polyoxyethylene sorbitan monolaurate, etc. Other examples of usable emulsifiers include polyoxyalkylene-containing anionic emulsifiers that have an anionic group and a polyoxyalkylene group, such as polyoxyethylene or polyoxypropylene, per molecule; and reactive anionic emulsifiers that have an anionic group and a polymerizable unsaturated group per molecule.

The amount of the emulsifier used is preferably 0.1 to 15 mass %, more preferably 0.5 to 10 mass %, and even more preferably 1 to 5 mass %, based on the total amount of the monomers used.

Examples of polymerization initiators include organic peroxides, such as benzoyl peroxide, octanoyl peroxide, lauroyl peroxide, stearoyl peroxide, cumene hydroperoxide, tert-butyl peroxide, tert-butyl peroxylaurate, tert-butyl peroxyisopropylcarbonate, tert-butylperoxyacetate, and diisopropylbenzene hydroperoxide; azo compounds, such as azobisisobutyronitrile, azobis(2,4-dimethylvaleronitrile), azobis(2-methylpropionenitrile), azobis(2-methylbutyronitrile), 4,4'-azobis(4-cyanobutanoic acid), dimethyl azobis(2-methylpropionate), azobis[2-methyl-N-(2-hydroxyethyl)-propionamide], and azobis{2-methyl-N-[2-(1-hydroxybutyl)]-propionamide}; persulfates, such as potassium persulfate, ammonium persulfate, and sodium persulfate; and the like. These polymerization initiators can be used singly or in a combination of two or more. Redox initiators prepared by combining a polymerization initiator mentioned above with a reducing agent, such as sugar, sodium formaldehyde sulfoxylate, iron complex, etc., may also be used.

The amount of the polymerization initiator used is generally preferably about 0.1 to 5 mass %, and more preferably 0.2 to 3 mass %, based on the total mass of the monomers used. The method of adding the polymerization initiator is not particularly limited, and can be suitably selected according to the type, amount, etc., of polymerization initiator. For example, the polymerization initiator may be incorporated into a monomer mixture or an aqueous medium beforehand, or may be added all at once or dropwise at the time of polymerization.

Further, a chain transfer agent can also be used for the purpose of adjusting the molecular weight of the resulting acrylic resin particles (A1). Examples of chain transfer agents include compounds having a mercapto group. Specific examples include lauryl mercaptan, t-dodecyl mercaptan, octyl mercaptan, 2-ethylhexyl thioglycolate, 2-methyl-5-tert-butylthiophenol, mercaptoethanol, thioglycerol, mercaptoacetic acid (thioglycolic acid), mercaptopropionate, n-octyl-3-mercaptopropionate, and the like. When such a chain transfer agent is used, the amount thereof is generally 0.05 to 10 mass %, and particularly preferably 0.1 to 5 mass %, based on the total amount of the monomers used.

The reaction temperature is mainly determined by the type of polymerization initiator. For example, the reaction temperature for an azo compound is preferably 60 to 90° C., and the reaction temperature for a redox initiator is preferably 30 to 70° C. The reaction time is generally 1 to 8 hours.

As the polymerizable unsaturated monomer, those conventionally known can be used. For example, reactive group-containing polymerizable unsaturated monomers and other polymerizable unsaturated monomers can be used.

Examples of the reactive group of the reactive group-containing polymerizable unsaturated monomer include functional groups with reactivity, such as hydroxy, acid, carbonyl, N-methylol alkyl ether, isocyanate, epoxy, amino, alkoxysilyl, carbodiimide, and hydrazide groups.

The term "(meth)acrylate" used herein means acrylate or methacrylate.

Examples of hydroxy-containing polymerizable unsaturated monomers include 2-hydroxyethyl (meth)acrylate, hydroxypropyl (meth)acrylate, 4-hydroxybutyl (meth)acrylate, tetrahydrofurfuryl (meth)acrylate, ε-caprolactone-modified tetrahydrofurfuryl (meth)acrylate, ε-caprolactone-modified hydroxyethyl (meth)acrylate, polyethylene glycol mono(meth)acrylate, polypropylene glycol mono(meth)acrylate, 2-hydroxy-3-phenoxypropyl (meth)acrylate, 2-hydroxy-3-butoxypropyl (meth)acrylate, phthalic acid monohydroxyethyl (meth)acrylate, and the like.

Among these, 2-hydroxyethyl (meth)acrylate, hydroxypropyl (meth)acrylate, 4-hydroxybutyl (meth)acrylate, and ε-caprolactone-modified hydroxyethyl (meth)acrylate can be suitably used.

Examples of acid group-containing polymerizable unsaturated monomers include carboxy- or acid anhydride group-containing polymerizable unsaturated monomers and the like.

Examples of carboxy- or acid anhydride group-containing polymerizable unsaturated monomers include acrylic acid, methacrylic acid, maleic acid, fumaric acid, crotonic acid, itaconic acid, β-carboxyethyl acrylate, and like unsaturated carboxylic acids and acid anhydrides thereof. Among these, acrylic acid and methacrylic acid can be suitably used.

Examples of polymerizable unsaturated monomers containing acid groups other than carboxy or acid anhydride groups include 2-acrylamide-2-methylpropanesulfonic acid, allylsulfonic acid, styrene sulfonic acid sodium salt, sulfoethyl methacrylate, and sodium salts and ammonium salts thereof, and the like.

Examples of carbonyl-containing polymerizable unsaturated monomers include acrolein, diacetone acrylamide, diacetone methacrylamide, formylstyrol, $C_{4-7}$ vinyl alkyl ketones, such as vinyl methyl ketone, vinyl ethyl ketone, and vinyl butyl ketone, and the like. Particularly preferred among these are diacetone acrylamide and diacetone methacrylamide.

Examples of N-methylol alkyl ether group-containing polymerizable unsaturated monomers include N-methylolacrylamide butyl ether and the like.

The isocyanate-containing polymerizable unsaturated monomer is a compound having at least one unblocked isocyanate group and at least one radically polymerizable double bond per molecule. Examples include methacryloylisocyanate, 2-isocyanatoethyl methacrylate, m- or p-isopropenyl-α,α'-dimethylbenzyl isocyanate, 1:1 (molar ratio) adducts of a hydroxy-containing polymerizable unsaturated monomer and a diisocyanate compound (e.g., equimolar adduct of 2-hydroxyethyl acrylate and isophorone diisocyanate), and the like.

Examples of epoxy-containing polymerizable unsaturated monomers include glycidyl acrylate, glycidyl methacrylate, CYCLOMER A-200 (alicyclic epoxy-containing monomer), CYCLOMER M-100 (alicyclic epoxy-containing monomer), and the like.

Examples of amino-containing polymerizable unsaturated monomers include dimethylaminoethyl acrylate, dimethylaminoethyl methacrylate, diethylaminoethyl acrylate, diethylaminoethyl methacrylate, dimethylaminopropyl acrylamide, dimethylaminopropyl methacrylamide, and the like.

Examples of alkoxysilyl-containing polymerizable unsaturated monomers include vinyltrimethoxysilane, vinyltriethoxysilane, vinyltripropoxysilane, vinyltributoxysilane, (meth)acryloyloxymethyltrimethoxysilane, (meth)acryloyloxyethyltrimethoxysilane, γ-(meth)acryloyloxypropyltrimethoxysilane, γ-(meth)acryloyloxypropyltriethoxysilane, (meth)acryloyloxyethyltriethoxysilane, (meth)acryloyloxypropyltributoxysilane, vinyltris-β-methoxyethoxysilane, divinylmethoxysilane, divinyldi-β-methoxyethoxysilane, and the like.

Examples of other polymerizable unsaturated monomers include $C_{1-24}$ alkyl or cycloalkyl esters of (meth)acrylic acid, such as methyl (meth)acrylate, ethyl (meth)acrylate, butyl (meth)acrylate, 2-ethylhexyl (meth)acrylate, lauryl (meth) acrylate, and cyclohexyl (meth)acrylate; $C_{1-16}$ alkoxyalkyl esters of (meth)acrylic acid, such as methoxybutyl acrylate, methoxybutyl methacrylate, methoxyethyl acrylate, methoxyethyl methacrylate, ethoxybutyl acrylate, ethoxybutyl methacrylate, and phenoxyethyl (meth)acrylate; aromatic unsaturated monomers, such as styrene, vinyltoluene, α-methylstyrene, N-vinylpyrrolidone, and vinylpyridine; olefins, such as ethylene, propylene, butylene, and pentene; diene compounds, such as butadiene, isoprene, and chloroprene; cyclohexenyl (meth)acrylate, dicyclopentenyl (meth) acrylate, dicyclopentenyloxyethyl (meth)acrylate, isobornyl (meth)acrylate, benzyl (meth)acrylate, N-butoxy (meth) acrylamide, adducts of glycidyl (meth)acrylate with amines, vinyl propionate, vinyl acetate, vinyl pivalate, VeoVa monomer (product of Shell Chemical Co.), and the like.

Among the above other polymerizable unsaturated monomers, $C_{4-24}$ alkyl esters of (meth)acrylic acid can be suitably used, in terms of the smoothness and distinctness of image of the resulting coating film.

Moreover, the acrylic resin particles (A1) may be crosslinked resin particles. Crosslinked resin particles can be obtained, for example, using a polymerizable unsaturated monomer having two or more polymerizable unsaturated groups per molecule as a monomer component.

Examples of polymerizable unsaturated monomers having two or more polymerizable unsaturated groups per molecule include allyl (meth)acrylate, ethylene glycol di(meth)acrylate, triethylene glycol di(meth)acrylate, tetraethylene glycol di(meth)acrylate, 1,3-butylene glycol di(meth)acrylate, trimethylol propane tri(meth)acrylate, 1,4-butanediol di(meth)acrylate, neopentyl glycol di(meth) acrylate, 1,6-hexanediol di(meth)acrylate, pentaerythritol di(meth)acrylate, pentaerythritol tetra(meth)acrylate, glycerol di(meth)acrylate, 1,1,1-tris-hydroxymethylethane di(meth)acrylate, 1,1,1-tris-hydroxymethylethane tri(meth) acrylate, 1,1,1-tris-hydroxymethylpropane tri(meth)acrylate, triallyl isocyanurate, diallyl terephthalate, divinylbenzene, etc. These monomers can be used singly or in a combination of two or more.

As the polymerizable unsaturated monomer having two or more polymerizable unsaturated groups per molecule, allyl (meth)acrylate, ethylene glycoldi(meth)acrylate, 1,4-butanedioldi(meth)acrylate, neopentyl glycoldi(meth)acrylate, and 1,6-hexanedioldi(meth)acrylate can be particularly suitably used.

The glass transition temperature of the acrylic resin particles (A1) is preferably −50 to 80° C., more preferably −50 to 60° C., and particularly preferably −40 to 60° C., in terms of the smoothness etc. of the resulting coating film.

In the present specification, the glass transition temperature Tg (absolute temperature) refers to a value calculated according to the following equation:

$$1/Tg = W_1/T_1 + W_2/T_2 + \ldots W_n/T_n$$

wherein $W_1$, $W_2$ ... $W_n$ are mass fractions of the respective monomers; and $T_1$, $T_2$ ... $T_n$ are glass transition temperatures (absolute temperatures) of homopolymers of the respective monomers.

The glass transition temperatures of homopolymers of the respective monomers are values shown in the Polymer Handbook, Fourth Edition, edited by J. Brandrup, E. H. Immergut, and E. A. Grulke, 1999. When the glass transition temperature of a monomer was not shown in the Handbook, a homopolymer of the monomer having a weight average molecular weight of around 50,000 was synthesized, and the glass transition temperature of the homopolymer was determined by differential scanning thermal analysis.

The average particle diameter of the acrylic resin particles (A1) can be adjusted to a desired size by adjusting particle size control factors, such as the monomer formulation, the type of emulsifier, the amount of emulsifier, the blending ratio of emulsifier, the type of neutralizer, and the amount of neutralizer.

Moreover, in the water dispersion of the acrylic resin particles (A1), the solids content is not particularly limited. In terms of the increase in the solids content and dispersion stability, the solids content is preferably 25 to 70 mass %, and particularly preferably 30 to 60 mass %.

Urethane Resin Particles (A2)

The urethane resin particles (A2) can be generally obtained from constituents containing a polyisocyanate component and a polyol component.

Examples of polyisocyanate components include alicyclic diisocyanates, aromatic diisocyanates, aliphatic diisocyanates, and polyisocyanates having three or more isocyanate groups per molecule.

Examples of alicyclic diisocyanates include isophorone diisocyanate, dicyclohexylmethane-4,4'-diisocyanate, trans-1,4-cyclohexyl diisocyanate, norbornane diisocyanate, and the like.

Among these, particularly preferable alicyclic diisocyanates are isophorone diisocyanate and dicyclohexylmethane-4,4'-diisocyanate, in terms of improving the organic solvent resistance of the resulting coating film.

Examples of aromatic diisocyanates include tolylene diisocyanate, diphenylmethane-4,4'-diisocyanate, p-phenylene diisocyanate, xylylene diisocyanate, 1,5-naphthylene diisocyanate, 3,3'-dimethyldiphenyl-4,4'-diisocyanate, dianisidine diisocyanate, tetramethylxylylene diisocyanate, and the like.

Examples of aliphatic diisocyanates include 1,6-hexamethylene diisocyanate, 2,2,4 and/or (2,4,4)-trimethylhexamethylene diisocyanate, lysine diisocyanate, and the like.

Examples of polyisocyanates having three or more isocyanate groups per molecule include isocyanurate trimers, biuret trimers, and trimethylolpropane adducts of the above-mentioned diisocyanates; and triphenylmethane triisocyanate, 1-methylbenzole-2,4,6-triisocyanate, dimethyl triphenylmethane tetraisocyanate, and like tri- or poly-functional isocyanates. These isocyanate compounds may be used in the form of modified products, such as carbodiimide-modified products, isocyanurate-modified products, and biuret-modified products.

The above polyisocyanates may be used in the form of blocked isocyanates blocked with blocking agents.

Examples of polyol components include polycarbonate polyols, ester bond-containing polyols, polycaprolactone polyols, polyether polyols, low-molecular-weight polyols, polybutadiene polyols, and silicone polyols.

The polycarbonate polyols are compounds obtained by a polycondensation reaction of a known polyol with a carbonylating agent according to a usual method. Examples of polyols include diols, and trihydric or higher polyhydric alcohols.

Examples of diols include linear diols, such as 1,3-propanediol, 1,4-butanediol, 1,5-pentanediol, 1,6-hexanediol, 1,7-heptanediol, 1,8-octanediol, 1,9-nonanediol, and 1,10-decanediol; branched diols, such as 2-methyl-1,3-propanediol, 3-methyl-1,5-pentanediol, neopentyl glycol, 2-ethyl-1,6-hexanediol, 2,2-diethyl-1,3-propanediol, 2-butyl-2-ethyl-1,3-propanediol, 2-methyl-1,8-octanediol, 2,2,4-trimethyl-1,3-pentanediol, and 2-ethyl-1,3-hexanediol; alicyclic diols, such as 1,3-cyclohexanediol, 1,4-cyclohexanediol, and 1,4-cyclohexane dimethanol; aromatic diols, such as p-xylenediol and p-tetrachloroxylenediol; and ether diols, such as diethylene glycol and dipropylene glycol. These diols can be used singly or in a combination of two or more.

Examples of trihydric or higher alcohols include glycerin, trimethylolethane, trimethylolpropane, trimethylolpropane dimer, and pentaerythritol. These trihydric or higher polyhydric alcohols can be used singly or in a combination of two or more.

Known carbonylating agents may be used as the carbonylating agent. Specific examples thereof include alkylene carbonates, dialkyl carbonates, diaryl carbonates, and phosgene. These compounds can be used singly or in a combination of two or more. Among these, preferable are ethylene carbonate, propylene carbonate, dimethyl carbonate, diethyl carbonate, dibutyl carbonate, diphenyl carbonate, etc.

Examples of ester bond-containing polyols include polyester polyols, polyester polycarbonate polyols, etc.

Examples of the polyester polyols include a polyester polyol obtained by direct esterification reaction and/or ester exchange reaction of a polyhydric alcohol with a polycarboxylic acid or an ester-forming derivative thereof (e.g., ester, anhydride, halide) whose amount is less than the stoichiometric amount of the polyhydric alcohol.

Examples of polyhydric alcohols include aliphatic diols, such as ethylene glycol, 1,2-propanediol, 1,3-propanediol, 2-methyl-1,3-propanediol, 2-butyl-2-ethyl-1,3-propanediol, 1,4-butanediol, neopentyl glycol, 3-methyl-2,4-pentanediol, 2,4-pentanediol, 1,5-pentanediol, 3-methyl-1,5-pentanediol, 2-methyl-2,4-pentanediol, 2,4-diethyl-1,5-pentanediol, 1,6-hexanediol, 1,7-heptanediol, 3,5-heptanediol, 1,8-octanediol, 2-methyl-1,8-octanediol, 1,9-nonanediol, 1,10-decanediol, diethylene glycol, and triethylene glycol; alicyclic diols, such as cyclohexanedimethanol and cyclohexanediol; and trihydric or higher polyhydric alcohols, such as trimethylolethane, trimethylolpropane, hexitols, pentitols, glycerol, pentaerythritol, and tetramethylolpropane.

Examples of polycarboxylic acids or ester-forming derivatives thereof include oxalic acid, malonic acid, succinic acid, glutaric acid, adipic acid, pimelic acid, suberic acid, azelaic acid, sebacic acid, dodecanedioic acid, 2-methylsuccinic acid, 2-methyladipic acid, 3-methyladipic acid, 3-methylpentanedioic acid, 2-methyloctanedioic acid, 3,8-dimethyldecanedioic acid, 3,7-dimethyldecanedioic acid, hydrogenated dimer acid, dimer acid, and like aliphatic dicarboxylic acids; phthalic acid, terephthalic acid, isophthalic acid, naphthalene dicarboxylic acid, and like aromatic dicarboxylic acids; 1,2-cyclopentane dicarboxylic acid, 1,3-cyclopentane dicarboxylic acid, 1,2-cyclohexane dicarboxylic acid, 1,3-cyclohexane dicarboxylic acid, 1,4-cyclohexane dicarboxylic acid, 1,4-dicarboxymethylcyclohexane, nadic acid, methylnadic acid, and like alicyclic dicarboxylic acids; tricarboxylic acids (e.g., trimellitic acid, trimesic acid, trimer of castor oil fatty acid, etc.) and like polycarboxylic acids; acid anhydrides of these polycarboxylic acids; halides such as chlorides and bromides of the polycarboxylic acids; lower esters of the polycarboxylic acids, such as methyl esters, ethyl esters, propyl esters, isopropyl esters, butyl esters, isobutyl esters, and amyl esters; and γ-caprolactone, δ-caprolactone, ε-caprolactone, dimethyl-ε-caprolactone, δ-valerolactone, γ-valerolactone, γ-butyrolactone, and like lactones.

Examples of polycaprolactone polyols include ring-opened polymers of caprolactones such as polycaprolactone diols.

Examples of low-molecular-weight polyols include polyhydric alcohols exemplified as polyester polyols.

Examples of polyether polyols include ethylene oxide and/or propylene oxide adducts of the low-molecular-weight polyols, polytetramethylene glycols, etc.

Examples of silicone polyols include hydroxy-terminated silicone oils having a siloxane bond in a molecule, and the like.

A carboxy-containing diol may be used as the polyol component. The carboxy-containing diol is used for introducing a hydrophilic group to the polyurethane molecules. The hydrophilic group is a carboxy group. Specific examples thereof include dimethylol propionic acid, dimethylol butanoic acid, dimethylol butyric acid, and dimethylol valeric acid.

In addition to the polyisocyanate component and the polyol component, an amine component may be used, if necessary. Examples of amine components include monoamine compounds, diamine compounds, and the like.

Any monoamine compound may be used, with no limitation; known monoamine compounds can be used singly or in a combination or two or more. Examples of the monoamine compounds include ethylamine, propylamine, 2-propylamine, butylamine, 2-butylamine, tertiary butylamine, isobutylamine, and like alkylamines; aniline, methylaniline, phenylnaphthylamine, naphtylamine, and like aromatic amines; cyclohexylamine, methylcyclohexylamine, and like alicyclic amines; 2-methoxy ethylamine, 3-methoxy propylamine, 2-(2-methoxyethoxy)ethylamine, and like ether amines; ethanolamine, propanolamine, butylethanolamine, 1-amino-2-methyl-2-propanol, 2-amino-2-methylpropanol, diethanolamine, diisopropanolamine, dimethylaminopropylethanolamine, dipropanolamine, N-methylethanolamine, N-ethylethanolamine, and like alkanolamines; etc. Of these, alkanolamines are preferable because they impart good water dispersion stability to the polyurethane molecules. 2-Aminoethanol and diethanolamine are particularly preferably in terms of supply stability.

Any diamine compound may be used, with no limitation; known diamine compounds can be used singly or in a combination or two or more. Examples of the diamine compounds include low-molecular-weight diamines (e.g., ethylenediamine, propylenediamine, etc.) obtained by substitution of an alcoholic hydroxy group in the above-exemplified low-molecular-weight diols with an amino group; polyoxypropylenediamine, polyoxyethylenediamine, and like polyetherdiamines; menthanediamine, isophoronediamine, norbornenediamine, bis(4-amino-3-methyldicyclohexyl)methane, diaminodicyclohexylmethane, bis(aminomethyl)cyclohexane, 3,9-bis(3-aminopropyl)2,4,8,10-tetraoxaspiro(5,5)undecane, and like alicyclic diamines; m-xylenediamine, α-(m/p-aminophenyl)ethylamine, m-phenylenediamine, diaminodiphenylmethane, diaminodiphenylsulfone, diaminodiethyldimethyldiphenylmethane, diaminodiethyldiphenylmethane, dimethylthiotoluenediamine, diethyltoluenediamine, α,α'-bis(4-aminophenyl)-p-disopropylbenzene, and like aromatic diamines; hydrazines; and dicarboxylic acid dihydrazide compounds, which are compounds formed between dicarboxylic acids exemplified by the polycarboxylic acids used for the polyester polyols, and hydrazines. Of these diamine compounds, low-molecular-weight diamines are preferable in terms of handling workability, with ethylenediamines being more preferable.

In addition to the above components, the urethane resin particles (A2) may also use an internal branching agent for imparting a branched structure to the polyurethane molecules, and an internal crosslinking agent for imparting a crosslinked structure to the polyurethane molecules. Trihydric or higher polyols can be suitably used as the internal branching agent and the internal crosslinking agent, and examples thereof include trimethylolpropane.

The method for producing the urethane resin particles (A2) is not particularly limited; known methods may be used. A preferable production method is as follows: a prepolymer or polymer is synthesized in a solvent that is inert to reaction and has high hydrophilicity, and the resulting product is fed to water to be dispersed. Examples include: (i) a method in which a prepolymer is synthesized from the polyisocyanate component and the polyol component in the above solvent, and the resulting product is reacted in water with the amine component, which is used if necessary; and (ii) a method in which a polymer is synthesized from the polyisocyanate component, the polyol component, and the amine component, which is used if necessary, and the resulting product is fed to water to be dispersed. Additionally, the neutralizer component, which is used if necessary, may be added in advance to water to which the resulting product is fed, or may be added to water after the resulting product is fed.

Examples of solvents that are inert to reaction and have high hydrophilicity, which are used in the preferable production method, include acetone, methyl ethyl ketone, dioxane, tetrahydrofuran, N-methyl-2-pyrrolidone, etc. These solvents are usually used in an amount of 3 to 100 mass % relative to the total amount of the starting materials used for producing a prepolymer or polymer.

In the above production methods, the composition ratio is not particularly limited. The composition ratio can be expressed in the molar ratio of isocyanate groups in the polyisocyanate component to isocyanate-reactive groups in the polyol component and the amine component when they are reacted. The molar ratio is preferably 1 (isocyanate groups): 0.5 to 2.0 (isocyanate-reactive groups), because when the amount of unreacted isocyanate groups in the dispersed urethane resin particles (polyurethane molecules) is insufficient, the adhesion and/or strength of the coating film may be reduced when the product is used as a coating composition, and the dispersion stability and/or properties of the coating composition may be affected by the unreacted isocyanate groups when they are present in excess. Additionally, the molar ratio of isocyanate-reactive groups in the polyol component to isocyanate groups in the polyisocyanate component is preferably 0.3 to 1.0:1, more preferably 0.5 to 0.9:1. Further, the molar ratio of isocyanate-reactive groups in the amine component, which is used if necessary, to isocyanate groups in the polyisocyanate component is preferably 0.1 to 1.0:1, more preferably 0.2 to 0.5:1.

Furthermore, the rate of neutralization by the neutralizer, which is used if necessary, is preferably set to a range that imparts sufficient dispersion stability to the resulting urethane resin particles (A2). The neutralizer is preferably used in the equivalent of 0.5 to 2.0 times, more preferably 0.7 to 1.5 times, per molecule of carboxy groups in the urethane resin particles (A2).

In order to improve the dispersibility of the urethane resin particles (A2), emulsifiers such as a surfactant and the like may be used.

Usable examples of the emulsifiers include widely known surfactants, such as anionic surfactants, nonionic surfactants, cationic surfactants, amphoteric surfactants, polymeric surfactants, reactive surfactants, etc., which are used for urethane resin emulsions. Among these, anionic surfactants and nonionic surfactants exemplified for the acrylic resin particles (A1) can also be suitably used.

The average particle diameter of the urethane resin particles (A2) can be adjusted to a desired size by adjusting particle size control factors, such as the formulation of raw materials (polyisocyanate component, polyol component, amine component, etc.), the type of emulsifier, the amount of emulsifier, the blending ratio of emulsifier, the type of neutralizer, and the amount of neutralizer.

Although the solids content of the water dispersion of the urethane resin particles (A2) is not particularly limited, the solids content is preferably 25 to 55 mass %, and particularly preferably 30 to 50 mass %, in terms of the increase in the solids content and dispersion stability.

Acrylic Urethane Composite Resin Particles (A3)

The acrylic urethane resin composite particles (A3) are resin composite particles in which a urethane resin component and an acrylic resin component are present in the same micelle. In the aqueous coating composition of the present invention, the form of the acrylic urethane resin composite particles is not particularly limited.

The urethane resin component and the acrylic resin component are preferably present in the acrylic urethane resin composite particles (A3) at a urethane resin:acrylic resin ratio ranging from 5:95 to 90:10 (mass ratio), and more preferably 10:90 to 80:20.

The component ratio of the urethane resin in the resin composite particles is preferably 5 mass % or more, in terms of the chipping resistance of the resulting coating film. Moreover, the above ratio is preferably 90 mass % or less in terms of the detergency of the aqueous coating composition (e.g., ease of removal of the coating composition from a coating device at the time of cleaning the coating device after the coating operation).

The weight average molecular weight of the urethane resin component in the acrylic urethane resin composite particles is preferably about 10000 to 100000, and particularly preferably about 20000 to 80000, in terms of the chipping resistance of the resulting coating film, and the detergency of the aqueous coating composition.

The weight average molecular weight is preferably 10000 or more, in terms of the chipping resistance of the resulting coating film. Moreover, the weight average molecular weight is preferably 100000 or less, in terms of productivity.

In the present specification, the weight average molecular weight can be measured using an "HLC-8120GPC" (trade name, produced by Tosoh Corporation) gel permeation chromatography apparatus together with four columns, i.e., "TSKgel G4000HXL" (one column), "TSKgel G3000HXL" (two columns), and "TSKgel G2000HXL" (one column) (trade names, produced by Tosoh Corporation); and a differential refractometer as a detector under the conditions of mobile phase: tetrahydrofuran, measurement temperature: 40° C., and flow rate: 1 mL/min.

The urethane resin component can be synthesized, for example, by using a polyisocyanate compound, a polyol, and a compound containing both an active hydrogen group and an ion-forming group.

More specifically, the urethane resin component can be synthesized, for example, in the following manner.

In a (meth)acrylic monomer that is not reactive with isocyanate groups, a polyisocyanate compound and a polyol are reacted with a compound containing both an active hydrogen group and an ion-forming group to obtain an isocyanate group-terminated urethane prepolymer or a hydroxyl group-terminated urethane prepolymer.

In view of cost etc., the polyol component preferably comprises a polyester polyol and/or a polyether polyol.

In this reaction, the ratio of NCO groups of the polyisocyanate compound to active hydrogen groups of the polyol and the compound containing both an active hydrogen group and an ion-forming group is preferably in the range of 0.8:1 to 3.0:1 (molar ratio).

The prepolymerization reaction is preferably conducted at 50 to 100° C. In order to prevent thermal polymerization of the (meth)acrylic monomer described later, a polymerization inhibitor, such as a p-methoxyphenol, is preferably added at about 20 to 3,000 ppm to the (meth)acrylic monomer in the presence of air, and the reaction is performed.

As a catalyst for the urethanization reaction, an organic tin compound such as dibutyltin dilaurate, dibutyltin dioctoate, or stannous octoate, organic bismuth compounds such as tris(2-ethylhexanoic acid) bismuth (III), or a tertiary amine compound such as triethylamine or triethylenediamine, can be used as desired. In this way, a (meth)acrylic monomer solution of an isocyanate group-terminated urethane prepolymer can be obtained.

As the polyisocyanate compound and the polyol, the polyisocyanate components and the polyol components exemplified for the urethane resin particles (A2) can also be used.

Examples of the compound containing both an active hydrogen group and an ion-forming group include compounds containing at least two hydroxy groups and at least one carboxy group per molecule, and compounds containing at least two hydroxy groups and at least one sulfonic acid group per molecule. This compound acts as an ion-forming group in the urethane resin.

Examples of carboxy-containing compounds include alkananol carboxylic acids, such as dimethylol propionic acid, dimethylol acetic acid, dimethylol butanoic acid, dimethylol heptanoic acid, dimethylolnonanoic acid, 1-carboxy-1,5-pentylenediamine, dihydroxybenzoic acid, and 3,5-diaminobenzoic acid; and half-ester compounds of polyoxypropylene trial with maleic anhydride or phthalic anhydride.

Examples of sulfonic acid group-containing compounds include 2-sulfonic acid-1,4-butanediol, 5-sulfonic acid-di-β-hydroxyethyl isophthalate, and N,N-bis(2-hydroxyethyl) aminoethylsulfonic acid.

When a carboxy- or sulfonic acid group-containing compound is used as the compound containing both an active hydrogen group and an ion-forming group, a neutralizer mentioned above can be used to form a salt and hydrophilize the compound. The particle size can be adjusted by the rate of neutralization of carboxy or sulfonic acid.

The neutralizer is preferably triethylamine or dimethylethanolamine in view of basicity and enhancing water resistance.

The acrylic resin component of the acrylic urethane resin composite particles (A3) can be obtained by polymerization using a polymerizable unsaturated monomer.

As the polymerizable unsaturated monomer, the polymerizable unsaturated monomers exemplified for the acrylic resin particles (A1) can also be used. The polymerizable unsaturated monomers can be used singly or in a combination of two or more.

The acrylic resin component of the acrylic urethane resin composite particles (A3) preferably has a hydroxyl value of 1 to 200 mgKOH/g, more preferably 2 to 180 mgKOH/g, and particularly preferably 5 to 170 mgKOH/g, in terms of the excellent water resistance etc. of the resulting coating film.

Moreover, the acrylic resin component of the acrylic urethane resin composite particles (A3) preferably has an acid value of 0 to 60 mgKOH/g, more preferably 0 to 50 mgKOH/g, and particularly preferably 0 to 40 mgKOH/g, in terms of the excellent smoothness, distinctness of image, etc., of the coating film.

Furthermore, the acrylic resin component of the acrylic urethane resin composite particles (A3) preferably has a glass transition temperature of −60 to 60° C., more preferably −55 to 50° C., and particularly preferably −50 to 40° C., in terms of the smoothness of the resulting coating film.

In view of improving the smoothness and distinctness of image of the resulting coating film, the acrylic resin component of the acrylic urethane resin composite particles (A3) preferably has a core/shell structure in which the center portion (core) and the outer shell portion (shell) are different in terms of resin composition.

When the acrylic resin component has a core/shell structure, the core/shell ratio by mass is preferably in the range of 5/95 to 95/5, more preferably 40/60 to 90/10, and even more preferably 45/55 to 85/15, on a solids basis, in view of enhancing the smoothness of the coating film.

When the acrylic resin component has a core/shell structure, the center portion (core) preferably has a glass transition temperature ($Tg_1$) in the range of −65 to −10° C., more preferably −60 to −20° C., and particularly preferably −55 to −25° C.

The outer shell portion (shell) preferably has a glass transition temperature ($Tg_2$) in the range of −50 to 150° C., more preferably −5 to 120° C., and particularly preferably 10 to 110° C.

It is also preferable that $Tg_2$ is greater than $Tg_1$, and that the difference between $Tg_2$ and $Tg_1$ is 5 to 200° C., more preferably 30 to 180° C., and particularly preferably 50 to 160° C.

When a (meth)acrylic monomer is further added to the (meth)acrylic monomer solution of a urethane prepolymer obtained by producing a urethane prepolymer in a (meth) acrylic monomer that is not reactive with isocyanate groups, there is no particular limitation on the timing of adding the monomer. The (meth)acrylic monomer may be added at any time before or after the neutralization step of the urethane prepolymer described below. A (meth)acrylic monomer may also be added to the dispersion after the neutralized urethane prepolymer is dispersed in water.

Further, by the reaction of a (meth)acrylic monomer having an active hydrogen group reactive with isocyanate groups with a (meth)acrylic monomer solution of an isocyanate group-terminated urethane prepolymer, a grafting reaction of the urethane prepolymer with an acrylic resin can be performed in the subsequent polymerization process of the (meth)acrylic monomer.

A representative method for producing the acrylic urethane resin composite particles (A3) is described below. However, the method is not limited thereto, and known methods for producing acrylic urethane resin composite particles can also be used.

The process until the production of a urethane prepolymer of the urethane resin component is as described above. In this process, the urethane prepolymer is synthesized in a polymerizable unsaturated monomer ((meth)acrylic monomer) that is not reactive with isocyanate groups.

The polymerizable unsaturated monomer ((meth)acrylic monomer) that is not reactive with isocyanate groups may be a part or the entirety of the constituent monomer of the acrylic resin component (the center portion (core) of the acrylic resin component when the acrylic resin component has a core/shell structure).

Subsequently, after a neutralizer is added to the polymerization reaction solution, water is added to subject an oil layer and an aqueous layer to phase invasion, and dispersed in water to obtain a water dispersion. A polymerization initiator is added to the water dispersion to allow a polymerization reaction of a polymerizable unsaturated monomer ((meth)acrylic monomer) to proceed. If necessary, a chain extension reaction of the urethane resin component (urethane prepolymer) (subjecting isocyanate groups to a chain extension reaction with water) may be further conducted to complete all of the polymerization reactions.

As a method for obtaining the water dispersion, the following method can also be performed, if necessary.

When a solution of the polymerizable unsaturated monomer ((meth)acrylic monomer) of the urethane prepolymer is dispersed in water, addition of a polyoxyalkylene-containing (meth)acrylic monomer enhances the dispersibility in water and can provide a uniform, more stable water dispersion. The polyoxyalkylene-containing (meth)acrylic monomer refers to a polymerizable unsaturated monomer that terminally contains a hydroxy group or a $C_{1-3}$ alkyleneoxy group, and that has a polyoxyethylene group and/or a polyoxypropylene group.

In view of enhancing the stability of the water dispersion of the polymerizable unsaturated monomer ((meth)acrylic monomer) solution of the urethane prepolymer or stability in the polymerization of the polymerizable unsaturated monomer ((meth)acrylic monomer), a small amount of emulsifier may also be used in combination.

As the emulsifier, for example, anionic surfactants and nonionic surfactants are preferable, and the emulsifiers exemplified for the acrylic resin particles (A1) can also be used.

As a method for dispersing the unsaturated monomer ((meth)acrylic monomer) solution of the urethane prepolymer in water, a usual stirrer can be used for the dispersion. To obtain a uniform water dispersion of finer particles, homomixers, homogenizers, dispersers, line mixers, etc., can be used.

After the water dispersion of the polymerizable unsaturated monomer ((meth)acrylic monomer) solution of the urethane prepolymer is thus obtained, a polymerization initiator is added thereto and the temperature is raised to the range of the polymerization temperature of the polymerizable unsaturated monomer ((meth)acrylic monomer). While the temperature is maintained in this range, and while optionally performing chain extension of the urethane prepolymer with water, the polymerizable unsaturated monomer ((meth)acrylic monomer) is polymerized to obtain a water dispersion of acrylic urethane resin composite particles (A3) comprising a urethane resin component and an acrylic resin component.

The polymerization reaction in the water dispersion can be performed by a known radical polymerization reaction. The polymerization initiator may be a water-soluble initiator or an oil-soluble initiator. When an oil-soluble initiator is used, the oil-soluble initiator is preferably added to the unsaturated monomer ((meth)acrylic monomer) solution of the urethane prepolymer before forming a water dispersion.

It is usually preferable that the polymerization initiator is used within the range of about 0.05 to 5 mass %, based on the total mass of all of the polymerizable unsaturated monomers ((meth)acrylic monomers).

The polymerization can be performed at a temperature of about 20 to 100° C. When a redox initiator is used, the polymerization can be performed at a temperature of about 75° C. or less.

As the polymerization initiator, the polymerization initiators exemplified for the acrylic resin particles (A1) can also be used. The polymerization initiators can be used singly or in a combination of two or more.

An organic or inorganic peroxide can be used in combination with a reducing agent in the form of a redox initiator. Examples of reducing agents include L-ascorbic acid, L-sorbic acid, sodium metabisulfite, ferric sulfate, ferric chloride, rongalite, and the like.

The method for adding the polymerization initiator is not particularly limited, and can be suitably selected according to the type and amount of the polymerization initiator. For example, the polymerization initiator may be incorporated beforehand into the monomer mixture or aqueous medium, or added at one time or dropwise at the time of polymerization. Any of the following methods can be used: a method of adding the initiator at one time at the beginning of the polymerization, a method of adding the initiator dropwise over time, or a method comprising incorporating a part of the initiator at the beginning of the polymerization, and then adding the rest of the initiator.

In view of sufficiently performing the polymerization reaction and reducing the residual monomers, it is also possible to add a polymerization initiator during the polymerization reaction or after the polymerization, and further conduct a polymerization reaction. In this case, any combination of polymerization initiators can be selected.

Generally, the amount of the polymerization initiator used is preferably about 0.1 to 5 mass %, and more preferably about 0.2 to 3 mass %, based on the total mass of the monomers used.

In the polymerization of the polymerizable unsaturated monomers ((meth)acrylic monomers), a known chain transfer agent can be used to adjust the molecular weight. As the chain transfer agent, those exemplified for the acrylic resin particles (A1) can also be used.

The monomer mixture for forming the acrylic resin component may contain components such as the above emulsifiers, polymerization initiators, reducing agents, and chain transfer agents as desired. Preferably, the monomer mixture is added dropwise as a monomer emulsion obtained by dispersing the monomer mixture into an aqueous medium; however, the monomer mixture may also be added dropwise unmodified. In this case, the particle size of the emulsified monomer is not particularly limited.

When chain extension of a urethane prepolymer is performed, a chain extender other than water may be added, if necessary, to react the urethane prepolymer with the chain extender. As the chain extender, a known chain extender having an active hydrogen can be used. Specific examples of such chain extenders include diamine compounds, such as ethylenediamine, hexamethylenediamine, cyclohexanediamine, cyclohexylmethanediamine, and isophoronediamine; and hydrazine.

In the preparation of a water dispersion of the acrylic urethane resin composite particles (A3), the composition of each resin component (acrylic resin component, urethane resin component), reaction conditions, etc., are adjusted to provide a water dispersion of the acrylic urethane resin composite particles (A3) in a desired form, such as having a core/shell structure or being in the state in which the acrylic resin component and the urethane component are partially or wholly mixed.

When the acrylic resin component is to have a core/shell structure in which the center portion (core) and the outer shell portion (shell) have different resin compositions, mixtures of at least two types of polymerizhle unsaturated monomers ((meth)acrylic monomers) having different compositions are used, and a reaction is performed at multiple stages (for example, unsaturated monomer mixtures having different compositions are prepared, and each unsaturated monomer mixture is added at multiple stages to allow the reaction to proceed), whereby a water dispersion of the acrylic urethane resin particles (A3) having a core/shell structure in which the center portion (core) and the outer shell portion (shell) have different resin compositions can be obtained as the acrylic resin component.

When the acrylic resin component is a water dispersion of the acrylic urethane resin composite particles (A3) having a core/shell structure in which the center portion (core) and the outer shell portion (shell) have different resin compositions, the center portion (core) of the acrylic resin component may have a urethane resin component mixed therein.

The average particle diameter of the acrylic urethane composite resin particles (A3) can be adjusted to a desired size by adjusting particle size control factors, such as the formulation of raw materials (acrylic resin component, urethane resin component, etc.), the type of emulsifier, the amount of emulsifier, the blending ratio of emulsifier, the type of neutralizer, and the amount of neutralizer.

Moreover, the solids content of the water dispersion of the acrylic urethane composite resin particles (A3) is not particularly limited; however, in terms of the increase in the solids content, and dispersion stability, the solids content is preferably 30 to 60 mass %, and particularly preferably 35 to 55 mass %.

Polyoxyalkylene Group-Containing Polyol (B)

To achieve an excellent finished appearance in terms of smoothness and distinctness of image, and excellent coating film performance in terms of chipping resistance etc., the polyoxyalkylene group-containing polyol (B) (also referred to as "the component (B)" in the present specification) has a number average molecular weight of 300 to 2000, preferably 300 to 1500, and more preferably 300 to 1000.

In addition, to achieve an excellent finished appearance in terms of smoothness and distinctness of image, and excellent coating film performance in terms of chipping resistance etc., the polyoxyalkylene group-containing polyol (B) has a hydroxyl value of preferably 40 to 500 mgKOH/g, more preferably 80 to 450 mgKOH/g, and particularly preferably 100 to 440 mgKOH/g.

Examples of the polyoxyalkylene group-containing polyol (B) include compounds obtained by adding an alkylene oxide to active hydrogen-containing compounds, such as polyhydric alcohol compounds, polyhydric phenol compounds, or polycarboxylic acid compounds. Examples of active hydrogen-containing compounds include water, polyhydric alcohol compounds (ethylene glycol, diethylene glycol, trimethylene glycol, propylene glycol, 1,4-butanediol, 1,6-hexanediol, neopentyl glycol, 1,4-dihydroxymethylcyclohexane, cyclohexylene glycol, and like dihydric alcohols; glycerin, trioxyisobutane, 1,2,3-butanetriol, 1,2,3-pentanetriol, 2-methyl-1,2,3-propanetriol, 2-methyl-2,3,4-butanetriol, 2-ethyl-1,2,3-butanetriol, 2,3,4-pentanetriol, 2,3,4-hexanetriol, 4-propyl-3,4,5-heptanetriol, 2,4-dimethyl-2,3,4-pentanetriol, pentamethylglycerin, pentaglycerin, 1,2,4-butanetriol, 1,2,4-pentanetriol, trimethylolethane, trimethylolpropane, and like trihydric alcohols; pentaerythritol, 1,2,3,4-pentanetetrol, 2,3,4,5-hexanetetrol, 1,2,4,5-pentanetetrol, 1,3,4,5-hexanetetrol, diglycerin, sorbitan, and like tetrahydric alcohols; adonitol, arabitol, xylitol, triglycerin, and like pentahydric alcohols; dipentaerythritol, sorbitol, mannitol, iditol, inositol, dulcitol, talose, allose, and like hexahydric alcohols; sucrose and like octahydric alcohols; polyglycerin, etc.); polyhydric phenols [polyhydric phenols (pyrogallol, hydroquinone, phloroglucin, etc.), bisphenols (bisphenol A, bisphenol sulfone, etc.)]; polycarboxylic acids [aliphatic polycarboxylic acids (succinic acid, adipic acid, etc.), aromatic polycarboxylic acids (phthalic acid, terephthalic acid, trimellitic acid, etc.)]; and the like.

Among these, from the viewpoint of reactivity, polyhydric alcohol compounds are preferable as active hydrogen-containing compounds. In particular, the active hydrogen-containing compound is preferably a polyhydric alcohol compound containing an alkylene group having 3 or more carbon atoms, and particularly preferably a polyhydric alcohol compound containing an alkylene group having 3 or 4 carbon atoms.

Further, among polyhydric alcohol compounds, dihydric and trihydric alcohols are particularly preferable in view of the smoothness and distinctness of image of the resulting multilayer coating film.

In particular, among the above-described polyhydric alcohol compounds, ethylene glycol, diethylene glycol, trimethylene glycol, propylene glycol, 1,4-butanediol, glycerol, and trimethylolpropane are preferable; and trimethylene glycol, propylene glycol, 1,4-butanediol, and glycerol are particularly preferable.

The polyoxyalkylene group-containing polyol (B) can be typically obtained by performing an addition reaction of an alkylene oxide to the active hydrogen-containing compound in the presence of an alkali catalyst at a temperature of 60 to 160° C. at ordinary pressure or under increased pressure by a usual method. Examples of alkylene oxides include ethylene oxide, propylene oxide, butylene oxide, and like alkylene oxides. Among these, propylene oxide and butylene oxide can be preferably used, and propylene oxide can be particularly preferably used. These may be used singly or in a combination of two or more. If two or more of them are used in combination, the addition may be performed blockwise or randomly.

As the polyoxyalkylene group-containing polyol (B), polyoxyalkylene glycols can be preferably used.

As the polyoxyalkylene glycols, commercially available products are usable. Examples thereof include, as polyethylene glycol, #300, #400, and #600 (all produced by Daiichi Kogyo Seiyaku Co., Ltd.); as polypropylene glycol, Hyprox MP-600 (produced by Dainippon Ink and Chemicals), Primepol PX-1000, Sannix SP-750, Sannix PP-400, Sannix PP-600, and Sannix PP-1000 (all produced by Sanyo Chemical Industries, Ltd.), Diol-400, Diol-700, and Diol-1000 (all produced by Mitsui Chemicals, Inc.); as polytetramethylene glycol, PTMG-650, PTMG-850, and PTMG-1000 (all produced by Mitsubishi Chemical Corporation); and the like.

Diester Compound (C)

The diester compound (C) (also referred to as "the component (C)" in the present specification) is a diester compound of a polyoxyalkylene glycol and an aliphatic monocarboxylic acid.

The diester compound (C) is represented by the following Formula (1):

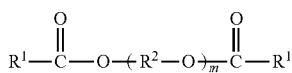

$$R^1-\overset{O}{\underset{\|}{C}}-O+R^2-O\overset{}{\underset{m}{\rightarrow}}\overset{O}{\underset{\|}{C}}-R^1 \quad (1)$$

wherein two $R^1$ are hydrocarbon groups having 4 to 18 carbon atoms, preferably 5 to 11 carbon atoms, more preferably 5 to 9 carbon atoms, and particularly preferably 6 to 8 carbon atoms, that may be the same or different; $R^2$ is a linear or branched alkylene group having 2 to 4 carbon atoms, preferably 2 or 3 carbon atoms, and more preferably 2 carbon atoms; m is an integer of 3 to 25, preferably 4 to 12, and more preferably 6 to 8; and m oxyalkylene units ($R^2$—O) may be the same or different.

From the viewpoint of the finished appearance in terms of smoothness and distinctness of image, and the water resistance of the resulting coating film, $R^1$ in Formula (1) are preferably alkyl groups having 4 to 18 carbon atoms, more preferably 5 to 11 carbon atoms, even more preferably 5 to 9 carbon atoms, and particularly preferably 6 to 8 carbon atoms. $R^1$ are preferably linear or branched alkyl groups, and more preferably branched alkyl groups. It is particularly preferable that $R^1$ in Formula (1) be $C_{6-8}$ branched alkyl groups. When $R^1$ are branched alkyl groups, the present coating composition is capable of forming a coating film having an excellent finished appearance, even if the coating composition is applied after relatively long-term storage.

The diester compound (C) can be obtained by, for example, an esterification reaction of a polyoxyalkylene glycol having two terminal hydroxy groups with a monocarboxylic acid having a $C_{4-18}$ hydrocarbon group.

Examples of the polyoxyalkylene glycol include polyethylene glycol, polypropylene glycol, copolymers of polyethylene and propylene glycol, polybutylene glycol, etc. Among these, it is particularly preferable to use polyethylene glycol. The polyoxyalkylene glycol generally has a number average molecular weight of 100 to 1,200, preferably 150 to 600, and more preferably 200 to 400.

Examples of the monocarboxylic acid having a $C_{4-18}$ hydrocarbon group include pentanoic acid, hexanoic acid, 2-ethylbutanoic acid, 3-methylpentanoic acid, benzoic acid, cyclohexanecarboxylic acid, heptanoic acid, 2-ethylpentanoic acid, 3-ethylpentanoic acid, octanoic acid, 2-ethylhexanoic acid, 4-ethylhexanoic acid, nonanoic acid, 2-ethylheptanoic acid, decanoic acid, 2-ethyloctanoic acid, 4-ethyloctanoic acid, dodecanoic acid, hexadecanoic acid, octadecanoic acid, and the like.

Among these, monocarboxylic acids having $C_{5-9}$ alkyl groups, such as hexanoic acid, heptanoic acid, 2-ethylpentanoic acid, 3-ethylpentanoic acid, octanoic acid, 2-ethylhexanoic acid, 4-ethylhexanoic acid, nonanoic acid, 2-ethylheptanoic acid, decanoic acid, 2-ethyloctanoic acid, and 4-ethyloctanoic acid, are preferable; monocarboxylic acids having $C_{6-8}$ alkyl groups, such as heptanoic acid, 2-ethylpentanoic acid, 3-ethylpentanoic acid, octanoic acid, 2-ethylhexanoic acid, 4-ethylhexanoic acid, nonanoic acid, and 2-ethylheptanoic acid, are more preferable; and monocarboxylic acids having $C_{6-8}$ branched alkyl groups, such as 2-ethylpentanoic acid, 3-ethylpentanoic acid, 2-ethylhexanoic acid, 4-ethylhexanoic acid, and 2-ethylheptanoic acid, are still more preferable.

The diesterification reaction of the polyoxyalkylene glycol with the monocarboxylic acid having a $C_{4-18}$ hydrocarbon group can be carried out by a known method. In this case, the above polyoxyalkylene glycols and monocarboxylic acids having a $C_{4-18}$ hydrocarbon group can be used singly or in a combination of two or more. Moreover, the molecular weight of the resulting diester compound (C) is preferably 320 to 1400, more preferably 450 to 1000, and particularly preferably 500 to 800.

Crosslinking Agent (D)

The crosslinking agent (D) (also referred to as "the component (D)" in the present specification) is not particularly limited. For example, depending on the crosslinking reactive groups of the resin particles (A), when the resin particles (A) have crosslinking reactive groups, and the hydroxyl groups of the polyoxyalkylene group-containing polyol (B), a crosslinking agent that is reactive with the crosslinking reactive groups and the hydroxyl groups can be used.

Specific examples of the crosslinking agent (D) include known crosslinking agents, such as amino resins, polyisocyanate compounds, polyhydrazide compounds, polysemicarbazide compounds, carbodiimide group-containing compounds, oxazoline group-containing compounds, epoxy compounds, polycarboxylic acids, and the like. Among these, amino resins and polyisocyanate compounds can be suitably used. The crosslinking agents may be used singly or in a combination of two or more.

Examples of usable amino resins include partially or fully methylolated amino resins obtained by reacting amino components with aldehyde components. Examples of amino components include melamine, urea, benzoguanamine, acetoguanamine, steroguanamine, spiroguanamine, dicyandiamide, and the like. Examples of aldehyde components include formaldehyde, paraformaldehyde, acetaldehyde, benzaldehyde, and the like.

The methylolated amino resins in which some or all of the methylol groups have been etherified with suitable alcohols are also usable. Examples of alcohols that can be used for the etherification include methyl alcohol, ethyl alcohol, n-propyl alcohol, i-propyl alcohol, n-butyl alcohol, i-butyl alcohol, 2-ethyl-1-butanol, 2-ethyl-1-hexanol, and the like.

Preferred amino resins are melamine resins. Particularly preferred are a methyl-etherified melamine resin obtained by etherifying some or all of the methylol groups of a partially or fully methylolated melamine resin with methyl alcohol; a butyl-etherified melamine resin obtained by etherifying some or all of the methylol groups of a partially or fully methylolated melamine resin with butyl alcohol; and a methyl-butyl mixed etherified melamine resin obtained by etherifying some or all of the methylol groups of a partially or fully methylolated melamine resin with methyl alcohol and butyl alcohol. A methyl-butyl mixed etherified melamine resin is more preferable.

The weight average molecular weight of the melamine resin is preferably 400 to 6,000, more preferably 500 to 4,000, and even more preferably 600 to 3,000.

A commercially available product can be used as the melamine resin. Examples of commercially available products include "Cymel 202," "Cymel 203," "Cymel 204," "Cymel 211," "Cymel 212," "Cymel 238," "Cymel 251," "Cymel 253," "Cymel 254," "Cymel 303," "Cymel 323," "Cymel 324," "Cymel 325," "Cymel 327," "Cymel 350," "Cymel 370," "Cymel 380," "Cymel 385," "Cymel 1156," "Cymel 1158," "Cymel 1116," and "Cymel 1130" (all produced by Allnex Japan Inc.); "Resimene 735," "Resimene 740," "Resimene 741," "Resimene 745," "Resimene 746," and "Resimene 747" (all produced by Monsanto Co., Ltd.); "U-Van 120," "U-Van 20HS," "U-Van 20SE," "U-Van 2021," "U-Van 2028," and "U-Van 28-60" (all produced by Mitsui Chemicals, Inc.); "SUMIMAL M55," "SUMIMAL M30W," and "SUMIMAL M50W" (all produced by Sumitomo Chemical Co., Ltd.); and the like.

When a melamine resin is used as the crosslinking agent (D), a sulfonic acid, such as paratoluenesulfonic acid, dodecylbenzenesulfonic acid, or dinonylnaphthalenesulfonic acid; a neutralization salt of such a sulfonic acid with amine; a neutralization salt of a phosphoric ester compound with amine; or the like may be used as a curing catalyst, if necessary.

Amino resins can be used as crosslinking agents, for example, for resins containing a hydroxyl group.

Polyisocyanate compounds have two or more isocyanate groups per molecule.

Specific examples of polyisocyanate compounds include aliphatic polyisocyanates, alicyclic polyisocyanates, aromatic-aliphatic polyisocyanates, aromatic polyisocyanates, and derivatives of these polyisocyanates.

Examples of aliphatic polyisocyanates include aliphatic diisocyanates, such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, and 2,6-diisocyanatomethyl caproate; aliphatic triisocyanates, such as lysine ester triisocyanate, 1,4,8-triisocyanateoctane, 1,6,11-triisocyanateundecane, 1,8-diisocyanato-4-isocyanatomethyloctane, 1,3,6-triisocyanatehexane, and 2,5,7-trimethyl-1,8-diisocyanato-5-isocyanatomethyloctane; and the like.

Examples of alicyclic polyisocyanates include alicyclic diisocyanates, such as 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (common name: isophorone diisocyanate), 4,4'-methylenebis(cyclohexyl isocyanate), methyl-2,4-cyclohexane diisocyanate, methyl-2,6-cyclohexane diisocyanate, 1,3- or 1,4-bis(isocyanatomethyl)cyclohexane (common name: hydrogenated xylylene diisocyanate) or mixtures thereof, and norbornane diisocyanate; alicyclic triisocyanates, such as 1,3,5-triisocyanatecyclohexane, 1,3,5-trimethylisocyanatocyclohexane, 2-(3-isocyanatopropyl)-2,5-di(isocyanatomethyl)-bicyclo(2.2.1)heptane, 2-(3-isocyanatopropyl)-2,6-di(isocyanatomethyl)-bicyclo(2.2.1)heptane, 3-(3-isocyanatopropyl)-2,5-di(isocyanatomethyl)-bicyclo(2.2.1)heptane, 5-(2-isocyanatoethyl)-2-isocyanatomethyl-3-(3-isocyanatopropyl)-bicyclo(2.2.1)heptane, 6-(2-isocyanatoethyl)-2-isocyanatomethyl-3-(3-isocyanatopropyl)-bicyclo(2.2.1)heptane, 5-(2-isocyanatoethyl)-2-isocyanatomethyl-2-(3-isocyanatopropyl)-bicyclo(2.2.1)heptane, and 6-(2-isocyanatoethyl)-2-isocyanatomethyl-2-(3-isocyanatopropyl)-bicyclo(2.2.1)heptane; and the like.

Examples of aromatic-aliphatic polyisocyanates include aromatic-aliphatic diisocyanates, such as 1,3- or 1,4-xylylene diisocyanate or mixtures thereof, ω,ω'-diisocyanato-1,4-diethylbenzene, and 1,3- or 1,4-bis(1-isocyanato-1-methylethyl)benzene (common name: tetramethylxylylene diisocyanate) or mixtures thereof; aromatic-aliphatic triisocyanates, such as 1,3,5-triisocyanatomethylbenzene; and the like.

Examples of aromatic polyisocyanates include aromatic diisocyanates, such as m-phenylene diisocyanate, p-phenylene diisocyanate, 4,4'-diphenyl diisocyanate, 1,5-naphthalene diisocyanate, 2,4'- or 4,4'-diphenylmethane diisocyanate or mixtures thereof, 2,4- or 2,6-tolylene diisocyanate or mixtures thereof, 4,4'-toluidine diisocyanate, and 4,4'-diphenylether diisocyanate; aromatic triisocyanates, such as triphenylmethane-4,4',4''-triisocyanate, 1,3,5-triisocyanatobenzene, and 2,4,6-triisocyanatotoluene; aromatic tetraisocyanates, such as diphenylmethane-2,2',5,5'-tetraisocyanate; and the like.

Examples of polyisocyanate derivatives include dimers, trimers, biurets, allophanates, carbodiimides, uretdiones, urethoimines, isocyanurates, oxadiazinetriones, polymethylene polyphenyl polyisocyanates (crude MDI, polymeric MDI), crude TDI, and the like of polyisocyanate compounds mentioned above.

Further, usable polyisocyanate compounds are blocked polyisocyanate compounds obtained by blocking free isocyanate groups of polyisocyanate compounds with a blocking agent. When a blocked polyisocyanate compound is heated to a dissociation temperature (e.g., 100° C. or more, preferably 130° C. or more), the isocyanate groups are regenerated and can readily react with reactive groups.

Examples of such blocking agents include phenol-based blocking agents, such as phenol, cresol, xylenol nitrophenol, ethylphenol, hydroxydiphenyl, butylphenol, isopropylphenol, nonylphenol, octylphenol, and hydroxymethyl benzoate; lactam-based blocking agents, such as ε-caprolactam, δ-valerolactam, γ-butyrolactam, and β-propiolactam; aliphatic alcohol-based blocking agents, such as methanol, ethanol, propyl alcohol, butyl alcohol, amyl alcohol, and lauryl alcohol; ether-based blocking agents, such as ethylene glycol monomethyl ether, ethylene glycol monoethyl ether, ethylene glycol monobutyl ether, diethylene glycol monomethyl ether, diethylene glycol monoethyl ether, propylene glycol monomethyl ether, and methoxymethanol; benzyl alcohol; glycolic acid; glycolates, such as methyl glycolate, ethyl glycolate, and butyl glycolate; lactic acid; lactates, such as methyl lactate, ethyl lactate, and butyl lactate; alcohol-based blocking agents, such as methylol urea, methylol melamine, diacetone alcohol, 2-hydroxyethyl acrylate, and 2-hydroxyethyl methacrylate; oxime-based blocking agents, such as formamidoxime, acetamidooxime, acetoxime, methylethylketoxime, diacetyl monoxime, benzophenone oxime, and cyclohexaneoxime; active methylene-based blocking agents, such as dimethyl malonate, diethyl malonate, ethyl acetoacetate, methyl acetoacetate, and acetylacetone; mercaptan-based blocking agents, such as butyl mercaptan, t-butyl mercaptan, hexyl mercaptan, t-dodecyl mercaptan, 2-mercaptobenzothiazole, thiophenol, methylthiophenol, and ethylthiophenol; acid amide-based blocking agents, such as acetanilide, acetanisidide, acetotoluide, acrylamide, methacrylamide, acetamide, stearamide, and benzamide; imide-based blocking agents, such as succinimide, phthalimide, and maleimide; amine-based blocking agents, such as diphenylamine, phenylnaphthylamine, xylidine, N-phenylxylidine, carbazole, aniline, naphthylamine, butylamine, dibutylamine, and butylphenylamine; imidazole-based blocking agents, such as imidazole and 2-ethylimidazole; pyrazole-based blocking agents, such as 3,5-dimethylpyrazole; urea-based blocking agents, such as urea, thiourea, ethylene urea, ethylene thiourea, and diphenylurea; carbamate-based blocking agents, such as phenyl N-phenylcarbamate; imine-based blocking agents, such as ethyleneimine and propyleneimine; sulfite salt-based blocking agents, such as sodium bisulfite and potassium bisulfite; and other blocking agents.

When a polyisocyanate compound is used as the crosslinking agent (D), an organic tin compound or the like can be used as a curing catalyst, if necessary.

Polyisocyanate compounds can be used as crosslinking agents, for example, for resins containing a hydroxyl or amino group.

Polyhydrazide compounds have two or more hydrazide groups per molecule.

Examples of polyhydrazide compounds include saturated aliphatic carboxylic acid dihydrazides having 2 to 18 carbon atoms, such as oxalic acid dihydrazide, malonic acid dihydrazide, succinic acid dihydrazide, glutaric acid dihydrazide, adipic acid dihydrazide, and sebacic acid dihydrazide; dihydrazides of monoolefinic unsaturated dicarboxylic acids, such as maleic acid dihydrazide, fumaric acid dihydrazide, and itaconic acid dihydrazide; polyhydrazides of carbonic acids, such as carbonic acid dihydrazide; polyhydrazides of aromatic polycarboxylic acids, such as dihydrazides of phthalic acid, terephthalic acid, or isophthalic acid, and dihydrazide, trihydrazide, or tetrahydrazide of pyromellitic acid; aliphatic trihydrazides, such as nitrilotriacetic acid trihydrazide, citric acid trihydrazide, and 1,2,4-benzene trihydrazide; tetrahydrazides, such as ethylenediaminetetraacetic acid tetrahydrazide and 1,4,5,8-naphthoic acid tetrahydrazide; polyhydrazides obtained by reacting a low polymer having a carboxylic acid lower alkyl ester group with hydrazine or hydrazine hydrate (see JPS52-22878B); and the like.

A polyhydrazide compound with overly high hydrophobicity makes dispersion in water difficult, and a uniform crosslinked coating film cannot be obtained. Thus, it is preferable to use a compound with moderate hydrophilicity having a relatively low molecular weight (about 300 or less). Examples of such polyhydrazide compounds include dihydrazide compounds of $C_4$-$C_{12}$ dicarboxylic acids, such as succinic acid dihydrazide, glutaric acid dihydrazide, adipic acid dihydrazide, and sebacic acid dihydrazide.

Polyhydrazide compounds can be used as crosslinking agents, for example, for resins containing a carbonyl group.

Polysemicarbazide compounds have two or more semicarbazide groups per molecule.

Examples of polysemicarbazide compounds include aliphatic, alicyclic, or aromatic bissemicarbazides; polyfunctional semicarbazides obtained by reacting diisocyanates, such as hexamethylene diisocyanate or isophorone diisocyanate, or polyisocyanate compounds derived therefrom, with excess N,N-substituted hydrazines, such as N,N-dimethylhydrazine, and/or hydrazides mentioned above; aqueous polyfunctional semicarbazides obtained by reacting isocyanate groups of reaction products of polyisocyanate compounds mentioned above, polyether, and active hydrogen compounds containing a hydrophilic group, such as polyols or polyethylene glycol monoalkyl ethers, with excess dihydrazides mentioned above (see, for example, JPH08-151358A); compounds having a semicarbazide group, such as mixtures of polyfunctional semicarbazides mentioned above and aqueous polyfunctional semicarbazides mentioned above; compounds having a hydrazone group, such as bisacetyl dihydrazone; and the like.

Polysemicarbazide compounds can be used as crosslinking agents, for example, for resins containing a carbonyl group.

Carbodiimide group-containing compounds are obtained, for example, by reacting isocyanate groups of polyisocyanate compounds with each other to remove carbon dioxide.

Examples of corresponding commercially available products include "Carbodilite V-02," "Carbodilite V-02-L2," "Carbodilite V-04," "Carbodilite E-01," and "Carbodilite E-02" (trade names, all produced by Nisshinbo Industries, Inc.).

Carbodiimide group-containing compounds can be used as crosslinking agents, for example, for resins containing a carboxyl group.

Examples of oxazoline group-containing compounds include (co)polymers obtained by copolymerizing polymers having an oxazoline group, such as polymerizable unsaturated monomers having an oxazoline group, optionally with other polymerizable unsaturated monomers by a known method (e.g., solution polymerization, emulsion polymerization, etc.).

Examples of polymerizable unsaturated monomers having an oxazoline group include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-ethyl-2-oxazoline, and the like.

Examples of other polymerizable unsaturated monomers include $C_{1-24}$ alkyl or cycloalkyl esters of (meth)acrylic acid, such as methyl (meth)acrylate, ethyl (meth)acrylate, propyl (meth)acrylate, butyl (meth)acrylate, 2-ethylhexyl (meth) acrylate, cyclohexyl (meth)acrylate, lauryl (meth)acrylate, and isobornyl (meth)acrylate; $C_{2-8}$ hydroxyalkyl esters of (meth)acrylic acid, such as 2-hydroxyethyl (meth)acrylate and hydroxypropyl (meth)acrylate; vinyl aromatic compounds, such as styrene and vinyl toluene; adducts of (meth)acrylamide, dimethylaminopropyl (meth)acrylamide, dimethylaminoethyl (meth)acrylate, or glycidyl (meth)acrylate with amines; polyethylene glycol (meth)acrylate; N-vinyl pyrrolidone, ethylene, butadiene, chloroprene, vinyl propionate, vinyl acetate, (meth)acrylonitrile, and the like. These can be used singly or in a combination of two or more.

Oxazoline group-containing compounds can be used as crosslinking agents, for example, for resins containing a carboxyl group.

Epoxy compounds have two or more epoxy groups per molecule. Specific examples include diepoxy compounds, such as bis(3,4-epoxycyclohexylmethyl)adipate, epoxy group-containing acrylic resins, and the like.

Epoxy compounds can be used as crosslinking agents, for example, for resins containing an acid or amino group.

Examples of polycarboxylic acids include aliphatic polybasic acids, such as adipic acid, azelaic acid, sebacic acid, 1,4-cyclohexanedicarboxylic acid, 1,2-cyclohexanedicarboxylic acid, 1,2,4-butanetricarboxylic acid, and 1,2,3,4-butanetetracarboxylic acid; aromatic polybasic acids, such as phthalic acid, isophthalic acid, terephthalic acid, and trimellitic acid; half-esters produced by addition reaction of polyol and 1,2-acid anhydride; addition reaction product of polyepoxide and 1,2-acid anhydride in an amount of 2 equivalents or more relative to the epoxy groups of the polyepoxide; carboxy-containing acrylic polymers; acrylic polymers having a group obtained by half-esterification of an acid anhydrous group; carboxy-containing polyester-based polymers; and the like.

Polycarboxylic acids can be used as crosslinking agents, for example, for epoxy or carbodiimide group-containing resins.

Aqueous Coating Composition

The amounts of the resin particles (A), the polyoxyalkylene group-containing polyol (B), the diester compound (C), and the crosslinking agent (D) in the aqueous coating composition of the present invention are as follows. Based on the total resin solids content of the components (A), (B), (C), and (D), the solids content of the resin particles (A) is 15 to 50 mass %, preferably 15 to 45 mass %, and more preferably 15 to 40 mass %; the solids content of the polyoxyalkylene group-containing polyol (B) is 0 to 23 mass %, preferably 2 to 22 mass %, and more preferably 4 to 21 mass %; the solids content of the diester compound (C) is 0 to 23 mass %, preferably 2 to 22 mass %, and more preferably 4 to 21 mass %; and the solids content of the crosslinking agent (D) is 20 to 85 mass %, preferably 20 to 75 mass %, and more preferably 25 to 70 mass %.

In the present specification, the term "and/or" means one or both of the former and the latter.

Moreover, the total solids content of the polyoxyalkylene group-containing polyol (B) and the diester compound (C) is 5 to 25 mass % based on the total solids content of the resin particles (A), the polyoxyalkylene group-containing polyol (B), the diester compound (C), and the crosslinking agent (D). In terms of smoothness and coating film performance, the total solids content of the polyoxyalkylene group-containing polyol (B) and the diester compound (C) is preferably 7 to 25 mass %, and more preferably 10 to 25 mass %. Therefore, the contents of the components (B) and (C) do not become 0 mass %.

The aqueous coating composition of the present invention may further contain other binders, in addition to the above components (A), (B), (C), and (D).

The other binders are not particularly limited. Examples include binders, such as acrylic resins, urethane resins, acrylic urethane composite resins, polyester resins, alkyd resins, and epoxy resins.

Acrylic Resin

The acrylic resin other than the acrylic resin particles (A1) has an average particle diameter outside the range of 300 to 1000 nm in the form of a water dispersion, and can be synthesized by copolymerization of a polymerizable unsaturated monomer by a known method. In terms of the increase in the solids content, an acrylic resin having an average particle diameter of less than 300 nm, which is smaller than that of the acrylic resin particles (A1), can be suitably used.

The acrylic resin may be one synthesized by emulsion polymerization or one synthesized by solution polymerization, and both can be used in combination. When the acrylic resin is synthesized by solution polymerization, the organic solvent used in the reaction is preferably a hydrophilic organic solvent, such as a propylene glycol ether-based solvent or a dipropylene glycol ether-based solvent. Moreover, in terms of water dispersibility, the acrylic resin preferably has an acid group, such as carboxyl.

When the acrylic resin is synthesized by emulsion polymerization, it can be synthesized in the same manner as in the acrylic resin particles (A1).

As the polymerizable unsaturated monomer, those exemplified for the acrylic resin particles (A1) can also be used.

The weight average molecular weight of the acrylic resin, when synthesized by solution polymerization, is preferably 1000 to 200000, and particularly preferably 2000 to 100000, in terms of weather resistance, finished appearance, etc.

When the acrylic resin has a hydroxyl group, the hydroxyl value thereof, when synthesized by solution polymerization, is preferably 10 to 250 mgKOH/g, and particularly preferably 30 to 150 mgKOH/g, in terms of the curability of the coating film. Moreover, in the case of an acrylic resin synthesized by emulsion polymerization, the hydroxyl value is preferably 5 to 150 mgKOH/g, and particularly preferably 10 to 90 mgKOH/g, in terms of the water resistance and curability of the coating film.

When the acrylic resin synthesized by solution polymerization has an acid group, the acid value is preferably 3 to 150 mgKOH/g, and particularly preferably 5 to 70 mgKOH/g, in terms of the dispersion stability in the aqueous coating composition, and the curability and adhesion of the coating film. Moreover, the acid value of an acrylic resin synthesized by emulsion polymerization is preferably 0.01 to 100 mgKOH/g, and particularly preferably 0.1 to 75 mgKOH/g, in terms of the water resistance of the coating film.

Urethane Resin

The urethane resin other than the urethane resin particles (A2) has an average particle diameter outside the range of 300 to 1000 nm in the form of a water dispersion, and can be synthesized by a known method from constituents containing a polyisocyanate component and a polyol component. In terms of the increase in the solids content, a urethane resin having an average particle diameter of less than 300 nm, which is smaller than that of the urethane resin particles (A2), can be suitably used. The urethane resin can be synthesized in the same manner as in the urethane resin particles (A2).

The number average molecular weight of the urethane resin is preferably 2000 or more, more preferably 5000 or more, and even more preferably 10000 or more, in terms of finished appearance, chipping resistance, etc.

When the urethane resin has a hydroxyl group, the hydroxyl value is preferably 0 to 100 mgKOH/g, more preferably 5 to 100 mgKOH/g, and even more preferably 10 to 100 mgKOH/g, in terms of the curability of the coating film.

When the urethane resin has an acid group, the acid value is preferably 5 to 40 mgKOH/g, more preferably 5 to 30 mgKOH/g, and even more preferably 10 to 30 mgKOH/g, in terms of the dispersion stability in the aqueous coating composition, the curability and adhesion of the coating film, etc.

Acrylic Urethane Composite Resin

The acrylic urethane composite resin other than the acrylic urethane composite resin particles (A3) has an average particle diameter outside the range of 300 to 1000 nm in the form of a water dispersion, and can be synthesized by a known method using an acrylic component and a urethane component as constituents. In terms of the increase in the solids content, an acrylic urethane composite resin having an average particle diameter of less than 300 nm, which is smaller than that of the acrylic urethane composite resin particles (A3), can be suitably used. A composite coating resin can be synthesized in the same manner as in the acrylic urethane composite resin particles (A3).

When the acrylic urethane composite resin has a hydroxyl group, the hydroxyl value is preferably 1 to 200 mgKOH/g, more preferably 1 to 170 mgKOH/g, and even more preferably 1 to 140 mgKOH/g, in terms of the curability of the coating film.

When the acrylic urethane composite resin has an acid group, the acid value is preferably 0 to 60 mgKOH/g, more preferably 0 to 50 mgKOH/g, and even more preferably 0 to 40 mgKOH/g, in terms of the dispersion stability in the aqueous coating composition, the curability and adhesion of the coating film, etc.

Polyester Resin

The polyester resin can be synthesized by esterification reaction of a polybasic acid and a polyhydric alcohol by a known method in a standard manner, and has an average particle diameter outside the range of 300 to 1000 nm in the form of a water dispersion. In terms of the increase in the solids content, a polyester resin having an average particle diameter of less than 300 nm can be suitably used. Moreover, in terms of water dispersibility, a polyester resin having an acid group, such as carboxyl, is preferable.

Polybasic acids are compounds having two or more carboxyl groups per molecule. Examples include phthalic acid, isophthalic acid, terephthalic acid, succinic acid, adipic acid, azelaic acid, sebacic acid, naphthalene dicarboxylic acid, 4,4-diphenyldicarboxylic acid, diphenylmethane-4,4'-dicarboxylic acid, HET acid, maleic acid, fumaric acid, itaconic acid, trimellitic acid, pyromellitic acid, cyclohexane-1,3-dicarboxylic acid, cyclohexane-1,4-dicarboxylic acid, hexahydrophthalic acid, hexahydroisophthalic acid, hexahydroterephthalic acid, tetrahydrophthalic acid, hexahydrotrimellitic acid, methyl hexahydrophthalic acid, and anhydrides thereof; and the like.

Polyhydric alcohols are compounds having two or more hydroxyl groups per molecule. Examples include glycols, such as ethylene glycol, propylene glycol, diethylene glycol, trimethylene glycol, tetraethylene glycol, triethylene glycol, dipropylene glycol, 1,4-butanediol, 1,3-butanediol, 2,3-butanediol, 1,2-butanediol, 3-methyl-1,2-butanediol, 1,2-pentanediol, 1,5-pentanediol, 1,4-pentanediol, 2,4-pentanediol, 2,3-dimethyltrimethylene glycol, tetramethylene glycol, 3-methyl-4,5-pentanediol, 2,2,4-trimethyl-1,3-pentanediol, 1,6-hexanediol, 1,5-hexanediol, 1,4-hexanediol, 2,5-hexanediol, neopentyl glycol, and neopentyl glycol hydroxypivalate; polylactone diols obtained by adding lactones, such as ε-caprolactone, to such glycols; polyester diols, such as bis(hydroxyethyl)terephthalate; 1,3-cyclohexanedimethanol, 1,4-cyclohexanedimethanol, tricyclodecanedimethanol, hydrogenated bisphenol A, hydrogenated bisphenol F, spiroglycol, dihydroxymethyltricyclodecane, glycerol, trimethylolpropane, trimethylolethane, diglycerol, triglycerol, 1,2,6-hexanetriol, pentaerythritol, dipentaerythritol, dipentaerythritol, sorbitol, and mannitol; hydroxycarboxylic acids, such as 2,2-dimethylolpropionic acid, 2,2-dimethylolbutanoic acid, 2,2-dimethylolpentanoic acid, 2,2-dimethylolhexanoic acid, and 2,2-dimethyloloctanoic acid; and the like.

Also usable usable as the polyester resin are fatty acid-modified polyester resins that are modified with fatty acids of (semi-)drying oils, such as linseed oil fatty acid, coconut oil fatty acid, safflower oil fatty acid, soybean oil fatty acid, sesame oil fatty acid, perilla oil fatty acid, hemp oil fatty acid, tall oil fatty acid, dehydrated castor oil fatty acid, etc. It is usually suitable that the proportion of such modifying fatty acid be not more than 30 mass % as an oil length. Moreover, the polyester resin may be obtained by reacting some monobasic acids, such as benzoic acid.

Further usable as the polyester resin are those obtained by reacting monoepoxy compounds, such as α-olefin epoxides (e.g., propylene oxide and butylene oxide) and Cardura E10 (trade name, produced by Japan Epoxy Resin Co., Ltd.; glycidyl ester of a synthetic highly branched saturated fatty acid), etc., with the acid group of the polyester resin.

When a carboxyl group is introduced into the polyester resin, the introduction can be carried out by, for example, adding an acid anhydride to hydroxy-containing polyester, followed by half-esterification.

When the polyester resin has a hydroxyl group, the hydroxyl value is preferably 10 to 250 mgKOH/g, and particularly preferably 40 to 170 mgKOH/g, in terms of the water resistance and curability of the coating film.

When the polyester resin has an acid group, the acid value is preferably 5 to 100 mgKOH/g, and particularly preferably 10 to 60 mgKOH/g, in terms of the water resistance and adhesion of the coating film.

The number average molecular weight of the polyester resin is preferably 1000 to 100000, and particularly preferably 1000 to 50000, in terms of the water resistance and curability of the coating film.

The other binders mentioned above also have an acid group, as with the resin particles (A). When they are dispersed in water, in order to facilitate dissolution and dispersion in water, it is preferable to perform neutralization using a neutralizer (e.g., one exemplified for the resin particles (A)), in terms of improving water dispersibility.

In the aqueous coating composition of the present invention, a pigment can be used, if necessary. Examples of pigments include color pigments, such as titanium oxide, zinc white, carbon black, phthalocyanine blue, Prussian blue, cobalt blue, azo pigments, phthalocyanine pigments, quinacridone pigments, isoindoline pigments, threne pigments, and perylene pigments; extender pigments, such as talc, clay, kaolin, baryta, barium sulfate, barium carbonate, calcium carbonate, silica, and alumina white; effect pigments, such as aluminum powder, mica powder, and titanium oxide-coated mica powder; and the like.

The amount of the pigment is preferably 0.1 to 100%, more preferably 0.5 to 50%, and even more preferably 1.0 to 30%, by PWC (pigment weight content) as the total pigment concentration, in terms of the increase in the solids content and finished appearance.

In the aqueous coating composition of the present invention, additives generally added to coating compositions, such as a curing catalyst, a dispersant, a viscosity control agent, an organic solvent, an antifoaming agent, a thickener, an ultraviolet absorber, a light stabilizer, an antioxidant, and a surface control agent, can be suitably used, if necessary.

The solvent used in the aqueous coating composition of the present invention is an aqueous medium. The aqueous medium is not limited as long as it mainly contains water. Examples include water and water-organic solvent mixed solutions containing water and organic solvents, such as water-soluble organic solvents. Examples of the organic solvent include water-soluble organic solvents, such as methyl alcohol, ethyl alcohol, isopropyl alcohol, propylene glycol monopropyl ether, ethylene glycol monobutyl ether, propylene glycol monomethyl ether, propylene glycol monobutyl ether, dipropylene glycol monomethyl ether, dipropylene glycol monobutyl ether, tripropylene glycol monomethyl ether, and 3-methyl-3-methoxybutanol. The organic solvents can be used singly or as a mixture of two or more. The organic solvent is preferably one mainly containing a water-soluble organic solvent. The mixing ratio of water and the organic solvent is not particularly limited; however, the content of the organic solvent is preferably 50 mass % or less, and particularly preferably 35 mass % or less, of the mixed solution.

General high-solid coating compositions mean that they have a high solids concentration in a viscosity usable as coating compositions (that allows coating that can satisfy the finished appearance of the resulting coating film).

The solids content can be determined as a heating residue, which is the mass fraction of residues obtained by evaporation under predetermined conditions specified in JIS K5601.

Specifically, for example, when the viscosity of the aqueous coating composition measured using Ford Cup No. 4 at 20° C. is adjusted to 40 to 50 seconds, the mass solids concentration thereof is 53 to 60 mass %.

However, the above requirement of the viscosity is not limited to the use of Ford Cup No. 4, and includes cases where substantially the same range is obtained using other similar measuring means.

The aqueous coating composition of the present invention can be applied to a substrate to form a coating film, which is the cured aqueous coating composition of the present invention, on the substrate. Thus, an article having a coating film obtained by curing the aqueous coating composition of the present invention can be obtained.

The aqueous coating composition of the present invention is a high-solid aqueous coating composition having wide coating operation width, an excellent finished appearance, and excellent coating film performance, such as chipping resistance; therefore, the aqueous coating composition of the present invention is suitable for use, for example, as a coating composition for automobiles, building materials, etc., particularly for automobiles.

The aqueous coating composition of the present invention can be applied by a known method, such as air spray coating, airless spray coating, rotary atomization coating, curtain coating, or roller coating. An electrostatic charge may be applied in these coating methods, if necessary. Such a coating method can be performed once or several times until the desired film thickness is obtained. The thickness of the coating film when cured is preferably within the range of 3 to 100 μm, and particularly preferably 5 to 60 μm. The coating film can be cured, for example, by heating at room temperature to 170° C., if necessary. Heat-curing can be performed by known heating means, for example, by using a hot-air furnace, electric furnace, electromagnetic induction heating furnace, or like drying furnace. If necessary, preheating may be performed at a temperature of about 50 to 80° C. for about 3 to 10 minutes before heat curing to promote vaporization of volatile components such as solvents.

The substrate (base material) is not particularly limited. Preferable examples of substrates include cold-rolled steel plates, galvanized steel plates, zinc alloy-plated steel plates, stainless steel plates, tinned steel plates, and like steel plates, aluminum plates, aluminum alloy plates, and like metal materials; polyethylene resin, polypropylene resin, acrylonitrile-butadiene-styrene (ABS) resin, polyimide resin, acrylic resin, vinylidene chloride resin, polycarbonate resin, polyurethane resin, epoxy resin, and like resins, various plastic materials, such as FRP; concrete surfaces, mortar surfaces, slate plates, roof tiles, PC plates, ALC plates, cement, cement calcium silicate plates, pottery, tiles, glass, wood, stone, coating film surfaces, and the like. Among these, metal materials and plastic materials are preferred.

The substrate may be, for example, the body of a vehicle formed from the materials mentioned above, such as an automobile, motorcycle, or container; or a building material formed from those materials.

The substrate may be a metal substrate or a vehicle body mentioned above, the metal surface of which has been subjected to a surface treatment, such as phosphate treatment, chromate treatment, or composite oxide treatment.

The substrate may have been subjected beforehand to undercoating (e.g., cationic electrodeposition coating) and, if necessary, further, intermediate coating or the like.

The substrate may have a coating film of a colored coating composition or the like further formed on the intermediate coating surface.

Before use, the aqueous coating composition of the present invention may be diluted to an appropriate viscosity by adding water and/or an organic solvent, etc., if necessary, and then applied.

The appropriate viscosity may vary depending on the formulation of the coating composition, but is generally in the range of about 20 to 60 seconds, and preferably about 25 to 50 seconds, as adjusted and measured at 20° C. using Ford Cup No. 4. Moreover, in the above, the coating solids concentration of the present coating composition is generally about 50 to 65 mass %, and preferably about 53 to 65 mass %.

The aqueous coating composition of the present invention can be suitably used as a coating composition for forming a first base coating film particularly in the following method for forming a multilayer coating film comprising three layers, the method comprises four steps:

A method for forming a multilayer coating film, the method comprising:

(1) applying the aqueous coating composition according to any one of claims 1 to 3 to a substrate to form a first base coating film;

(2) applying an aqueous base coating composition to the uncured first base coating film to form a second base coating film;

(3) applying a clear coating composition to the uncured second base coating film to form a clear coating film; and (4) simultaneously curing the uncured first base coating film, second base coating film, and clear coating film by heating.

Step (1)

The aqueous coating composition of the present invention can be applied to the substrate mentioned above by a known method, such as air spray coating, airless spray coating, or rotary atomization coating. Among these methods, air spray coating, rotary atomization coating, and like methods are preferable. An electrostatic charge may be applied during coating. The aqueous coating composition is typically applied to a cured film thickness of about 5 to 70 μm, preferably about 10 to 50 μm, and more preferably about 10 to 40 μm.

Step (2)

An aqueous base coating composition is further applied to the first base coating film formed as described above.

The coating of the aqueous base coating composition is preferably performed when the solids content of the first base coating film is within the range of 70 to 100 mass %, preferably 80 to 100 mass %, and even more preferably 90 to 100 mass %, in terms of suppressing coating film defects, such as popping and sagging, and ensuring the smoothness of the resulting coating film.

The solids content of the first base coating film can be adjusted, for example, by performing preheating, air blow, or the like, before the aqueous base coating composition is applied.

The preheating is generally performed by directly or indirectly heating the coated substrate in a drying furnace at a temperature of about 50 to 110° C., preferably about 60 to 80° C., for about 1 to 30 minutes.

The air blow is generally performed by blowing air at room temperature or at about 25° C. to 80° C. onto the coated surface of the substrate.

The solids content of the first base coating film can be measured, for example, by the following method.

First, the aqueous coating composition of the present invention is applied to a substrate, and also applied to an aluminum foil whose mass ($W_1$) is measured beforehand. Subsequently, the coated aluminum foil is subjected to preheating or the like, if necessary. Immediately before applying the aqueous base coating composition, the aluminum foil is removed to measure the mass of the aluminum foil ($W_2$). Next, the removed aluminum foil is dried at 110° C. for 60 minutes, and allowed to cool to room temperature in a desiccator. The mass ($W_3$) of the aluminum foil is then measured. The solids content is calculated according to the following formula:

Solids content (mass %)=$\{(W_3-W_1)/(W_2-W_1)\} \times 100$

As the aqueous base coating composition, for example, known coating compositions generally used in the coating of automobile bodies can be used. Specific examples include coating compositions prepared by dissolving or dispersing a resin component comprising a base resin, such as an acrylic, polyester, alkyd, urethane, or epoxy resin containing a crosslinkable functional group such as a carboxy or hydroxy group, and a crosslinking agent, such as a polyisocyanate compound, melamine resin, or urea resin that may be blocked, together with a pigment and other additives, in water. In particular, thermosetting aqueous coating compositions using the above-mentioned acrylic resin and/or polyester resin as the base resin and a melamine resin as the crosslinking agent can be advantageously used.

The pigment component may be a color pigment, an effect pigment, an extender pigment, etc., exemplified in the explanation of the coating composition of the present invention. By using an effect pigment as at least one pigment component, it is possible to form a metallic or pearl coating film having density in appearance.

Examples of the effect pigment include aluminum (including vapor-deposited aluminum), copper, zinc, brass, nickel, aluminum oxide, mica, titanium oxide- or iron oxide-coated aluminum oxide, titanium oxide- or iron oxide-coated mica, glass flakes, holographic pigments, etc. Among these, aluminum, aluminum oxide, mica, titanium oxide- or iron oxide-coated aluminum oxide, and titanium oxide- or iron oxide-coated mica are more preferable; and aluminum is particularly preferable. Such effect pigments can be used singly or in a combination of two or more.

The above effect pigment is preferably in the form of flakes. As the effect pigment, pigments having a longitudinal dimension of 1 to 100 μm, particularly 5 to 40 μm, and a thickness of 0.001 to 5 μm, particularly 0.01 to 2 μm, are suitable.

When the aqueous base coating composition contains an effect pigment described above, it is suitable that the amount of effect pigment be typically 1 to 50 parts by mass, more preferably 2 to 30 parts by mass, and even more preferably 3 to 20 parts by mass, per 100 parts by mass of the resin solids content in the aqueous base coating composition.

The aqueous base coating composition preferably contains a hydrophobic solvent.

The hydrophobic solvent is preferably an alcohol hydrophobic solvent in view of the excellent brilliance of the resulting coating film. In particular, $C_{7-14}$ alcohol hydrophobic solvents, such as at least one alcohol hydrophobic solvent selected from the group consisting of 1-octanol, 2-octanol, 2-ethyl-1-hexanol, ethylene glycol mono-2-ethylhexyl ether, propylene glycol mono-n-butyl ether, and dipropylene glycol mono-n-butyl ether, are more preferable.

When the aqueous base coating composition contains a hydrophobic solvent, the amount of hydrophobic solvent is preferably 2 to 70 parts by mass, more preferably 11 to 60 parts by mass, and even more preferably 16 to 50 parts by mass, per 100 parts by mass of the resin solids content in the aqueous base coating composition, in view of the excellent brilliance of the resulting coating film.

The aqueous base coating composition can be applied by a known method, such as air spray coating, airless spray coating, or rotary atomization coating. An electrostatic charge may be applied during coating. The coating composition can typically be applied to a cured film thickness of 5 to 40 μm, and preferably 10 to 30 μm.

The aqueous base coating composition may further contain, if necessary, additives usually used for coating compositions, such as curing catalysts, thickeners, UV absorbers, light stabilizers, antifoaming agents, plasticizers, organic solvents, surface control agents, and antisettling agents. Such additives can be used singly or in a combination of two or more.

The coating film (second base coating film) of the coated aqueous base coating composition can be dried by heating at a temperature of about 50 to 110° C., and preferably about 60 to 90° C., for about 1 to 60 minutes by, for example, preheating, air blowing, etc.

Step (3)

A clear coating composition is further applied to the second base coating film formed as described above.

As the clear coating composition, any known thermosetting clear coating composition generally used for coating of automobile bodies etc. can be used. Examples of such thermosetting clear coating compositions include organic solvent-type thermosetting coating compositions, aqueous thermosetting coating compositions, and powder thermosetting coating compositions, all of which contain a crosslinking agent and a base resin having a crosslinkable functional group.

Examples of the crosslinkable functional group contained in the base resin include carboxy, hydroxy, epoxy, silanol, etc. Examples of the base resin include acrylic resins, polyester resins, alkyd resins, urethane resins, epoxy resins, fluororesins, etc. Examples of the crosslinking agent include polyisocyanate compounds, blocked polyisocyanate compounds, melamine resins, urea resins, carboxy-containing compounds, carboxy-containing resins, epoxy-containing resins, epoxy-containing compounds, etc.

Examples of preferable combinations of base resin/crosslinking agent for the clear coating composition are carboxy-containing resin/epoxy-containing resin, hydroxy-containing resin/polyisocyanate compound, hydroxy-containing resin/blocked polyisocyanate compound, hydroxy-containing resin/melamine resin, etc.

The clear coating composition may be a single-liquid type coating composition, or a multi-liquid type coating composition such as a two-liquid type urethane resin coating composition.

If necessary, the clear coating composition may contain color pigments, effect pigments, dyes, etc., in amounts such that the transparency of the clear coating composition is not impaired; and may further contain extender pigments, UV absorbers, light stabilizers, antifoaming agents, thickening agents, anticorrosives, surface control agents, etc.

The clear coating composition can be applied to the second base coating film by a known method, such as airless spray coating, air spray coating, or rotary atomization coating. An electrostatic charge may be applied during coating. The clear coating composition can typically be applied to a cured film thickness of 10 to 60 μm, and preferably 25 to 50 μm.

Step (4)

The multilayer coating film comprising three coating films, i.e., the first base coating film, the second base coating film, and the clear coating film, formed in the above manner, can be cured by a usual method for baking coating films, such as air-blowing, infrared heating, or high-frequency heating. The heating temperature is preferably about 80 to 170° C., and more preferably about 120 to 160° C., The heating time is about 20 to 40 minutes. This heating allows the three layers to be simultaneously cured.

EXAMPLES

The present invention is described in further detail below with reference to Examples and Comparative Examples. However, the present invention is not limited to only these Examples. Note that "parts" and "%" are expressed on a mass basis.
Production of Resin Particles (A)
Production of Acrylic Resin Particles (A1)

Production Example 1

67.2 parts of 2-ethylhexyl acrylate and 2.8 parts of allyl methacrylate were mixed in a glass beaker. Subsequently, 7 parts of "Newcol 707SF" (trade name, produced by Nippon Nyukazai Co., Ltd.; an anionic emulsifier having a polyoxyethylene chain, active ingredient: 30%) and 70 parts of deionized water were added to the mixture, and stirred by a disperser at 2000 rpm for 15 minutes, thereby preparing a pre-emulsion (1). The pre-emulsion (1) was subjected to high pressure treatment using a high-pressure emulsifying device (Ultimaizer, produced by Sugino Machine Ltd.) to thereby obtain a monomer emulsion (1) having an average particle diameter of 570 nm.

Further, 1.2 parts of allyl methacrylate, 4.8 parts of 4-hydroxybutyl acrylate, 1.2 parts of methacrylic acid, and 22.8 parts of methyl methacrylate were mixed in another glass beaker. Subsequently, 3 parts of "Newcol 707SF," 0.03 parts of ammonium persulfate, and 20 parts of deionized water were added to the mixture, and stirred by a disperser at 2000 rpm for 15 minutes, thereby preparing a monomer emulsion (2).

The monomer emulsion (1) was transferred to a reactor equipped with a thermometer, a thermostat, a stirrer, a reflux condenser, a nitrogen introducing tube, and a dropping funnel, and diluted with 59 parts of deionized water. Thereafter, the temperature was increased to 80° C., 0.7 parts of ammonium persulfate was supplied, and the mixture was stirred for 3 hours while maintaining the temperature at 80° C.

Further, the monomer emulsion (2) was added dropwise over 1 hour, and the mixture was aged for 1 hour, and then cooled to 30° C. The pH was adjusted to 8.0 while gradually adding a 5% 2-(dimethylamino)ethanol solution to the reactor. Further, the mixture was diluted with deionized water to a solids concentration of 30%, thereby obtaining an acrylic resin particle (A1-1) dispersion.

The average particle diameter of the obtained acrylic resin particles (A1-1) was 600 nm (as measured at 20° C. using a "COULTER N4" submicron particle size distribution analyzer (produced by Beckman Coulter, Inc.) in a state diluted with deionized water), the hydroxyl value was 19 mgKOH/g, and the acid value was 8 mgKOH/g.

Production Example 2

An acrylic resin particle (A1-2) dispersion having a solids concentration of 30% was obtained in the same manner as in Production Example 1, except that the pressure in the high-pressure emulsification to obtain the monomer emulsion (1) in Production Example 1 was adjusted to obtain a monomer emulsion (1) having an average particle diameter of 850 nm.

The average particle diameter of the obtained acrylic resin particles (A1-2) was 900 nm (as measured at 20° C. using a "COULTER N4" submicron particle size distribution analyzer (produced by Beckman Coulter, Inc.) in a state diluted with deionized water), the hydroxyl value was 19 mgKOH/g, and the acid value was 8 mgKOH/g.

Production Example 3

An acrylic resin particle (A1-3) dispersion having a solids concentration of 30% was obtained in the same manner as in Production Example 1, except that the pressure in the high-pressure emulsification to obtain the monomer emulsion (1) in Production Example 1 was adjusted to obtain a monomer emulsion (1) having an average particle diameter of 170 nm.

The average particle diameter of the obtained acrylic resin particles (A1-3) was 200 nm (as measured at 20° C. using a "COULTER N4" submicron particle size distribution analyzer (produced by Beckman Coulter, Inc.) in a state diluted with deionized water), the hydroxyl value was 19 mgKOH/g, and the acid value was 8 mgKOH/g.
Production of Urethane Resin Particles (A2)

Production Example 4

68.9 parts of "PTMG-1000" (trade name, produced by Mitsubishi Chemical Corporation; polytetramethylene ether glycol, molecular weight: about 1000), 2.9 parts of dimethylolpropionic acid, 1.5 parts of trimethylolpropane, 0.1 part of "Neostann U-600" (trade name, produced by Nitto Kasei Co., Ltd.; a bismuth-based catalyst), and 100 parts of methyl ethyl ketone solvent were placed in a reactor equipped with a thermometer, a thermostat, a stirrer, and a reflux condenser. After the temperature was increased to 80° C. while stirring, 26.1 part of isophorone diisocyanate was added dropwise over 30 minutes. Thereafter, the temperature was maintained at 80° C., and the reaction was continued until the NCO value was 6.2 mg/g or less, followed by cooling to room temperature, thereby obtaining a prepolymer solution of a polyurethane resin having a terminal isocyanate group. The number average molecular weight of the obtained urethane prepolymer was 9000.

Stirring was then continued, and the resin viscosity was reduced using 100 parts of methyl ethyl ketone solvent. Then, 1.2 parts of dimethylethanolamine was added for neutralization, and water dispersion (phase-inversion emulsification) was performed while suitably adding 148.8 parts of deionized water.

After completion of water dispersion (emulsification), 0.6 parts of ethylenediamine was added, and the mixture was heated to 40° C. and stirred for 2 hours. Thus, a chain extension reaction of the terminal isocyanate group of the urethane resin and diamine was performed.

Thereafter, stirring was continued, and reduced desolvation was performed while heating to 60° C. When the mixed methyl ethyl ketone solvent was completely removed, the pressure was returned to ordinary pressure, followed by cooling, and the excessively removed deionized water was supplemented, thereby obtaining a water dispersion of urethane resin particles (A2-1) having a mass solids concentration of 40%.

The average particle diameter of the obtained urethane resin particles (A2-1) was 330 nm (as measured at 20° C. using a "COULTER N4" submicron particle size distribution analyzer (produced by Beckman Coulter, Inc.) in a state diluted with deionized water), the acid value was 12 mgKOH/g, the hydroxyl value was 0 mgKOH/g, and the viscosity was 350 mPa·s (B-type viscometer, 60 rpm, 23° C.). The number average molecular weight exceeded the elimination limit of the GPC measuring apparatus, and could not be measured (it is estimated to be about 1 million or more).

Production Example 5

A water dispersion of urethane resin particles (A2-2) having a mass solids concentration of 40% was obtained in the same manner as in Production Example 4, except that the amount of dimethylethanolamine as the neutralizing amine was reduced to 0.6 parts.

The average particle diameter of the obtained urethane resin particles (A2-2) was 520 nm (as measured at 20° C. using a "COULTER N4" submicron particle size distribution analyzer (produced by Beckman Coulter, Inc.) in a state diluted with deionized water), the acid value was 12 mgKOH/g, the hydroxyl value was 0 mgKOH/g, and the viscosity was 150 mPa·s (B-type viscometer, 60 rpm, 23° C.). The number average molecular weight exceeded the elimination limit of the GPC measuring apparatus, and could not be measured (it is estimated to be about 1 million or more).

Production Example 6

A water dispersion of urethane resin particles (A2-3) having a mass solids concentration of 40% was obtained in the same manner as in Production Example 4, except that "ETERNACOLL UH-100" (trade name, produced by Ube Industries, Ltd.; 1,6-hexanediol-based polycarbonatediol, molecular weight: about 1000) was used in place of "PTMG-1000."

The average particle diameter of the obtained urethane resin particles (A2-3) was 320 nm (as measured at 20° C. using a "COULTER N4" submicron particle size distribution analyzer (produced by Beckman Coulter, Inc.) in a state diluted with deionized water), the acid value was 12 mgKOH/g, the hydroxyl value was 0 mgKOH/g, and the viscosity was 210 mPa·s (B-type viscometer, 60 rpm, 23° C.). The number average molecular weight exceeded the elimination limit of the GPC measuring apparatus, and could not be measured (it is estimated to be about 1 million or more).

Production Example 7

A water dispersion of urethane resin particles (A2-4) having a mass solids concentration of 40% was obtained in the same manner as in Production Example 4, except that the amount of dimethylethanolamine as the neutralizing amine was increased to 1.5 parts.

The average particle diameter of the obtained urethane resin particles (A2-4) was 250 nm (as measured at 20° C. using a "COULTER N4" submicron particle size distribution analyzer (produced by Beckman Coulter, Inc.) in a state diluted with deionized water), the acid value was 12 mgKOH/g, the hydroxyl value was 0 mgKOH/g, and the viscosity was 2500 mPa·s (B-type viscometer, 60 rpm, 23° C.). The number average molecular weight exceeded the elimination limit of the GPC measuring apparatus, and could not be measured (it is estimated to be about 1 million or more).

Production of Acrylic Urethane Composite Resin Particles (A3)

Production Example 8

35.9 parts of "PTMG-1000" (trade name, produced by Mitsubishi Chemical Corporation; polytetramethylene ether glycol, molecular weight: about 1000), 2.8 parts of dimethylolpropionic acid, 14 parts of n-butyl acrylate, 30.5 parts of 2-ethylhexyl acrylate, 0.01 part of butylhydroxytoluene, and 0.1 part of "Neostann U-600" (trade name, produced by Nitta Kasei Co., Ltd.; a bismuth-based catalyst) were placed in a reactor equipped with a thermometer, a thermostat, a stirrer, and a reflux condenser. After the temperature was increased to 90° C., 11.3 parts of isophorone diisocyanate was added dropwise over 30 minutes. Thereafter, the temperature was maintained at 90° C., and the reaction was continued until the NCO value was 1 mg/g or less, followed by cooling to room temperature. 3.5 parts of 2-hydroxyethyl methacrylate and 1 part of allyl methacrylate were added to the reaction product to thereby obtain a hydroxy-containing polyurethane resin diluted with an acrylic monomer. The acid value of the obtained polyurethane resin was 24 mgKOH/g, the hydroxyl value was 14 mgKOH/g, and the weight average molecular weight was 25000.

1.1 part of dimethylethanolamine as a neutralizing amine was added to the hydroxy-containing polyurethane resin diluted with an acrylic monomer, and phase-inversion emulsification was performed using 143 parts of deionized water at room temperature. The mixture was heated to 70° C. while stirring, and an initiator solution prepared by dissolving 0.1 part of "VA-057" (trade name, produced by Wako Pure Chemical Industries, Ltd.; a polymerization initiator for emulsion polymerization) in 4 parts of deionized water was added dropwise to the flask over 30 minutes. The mixture was stirred for 2 hours while maintaining this temperature. Further, an initiator solution prepared by dissolving 0.05 parts of "VA-057" in 2 parts of deionized water was placed in the flask, and the mixture was stirred for 2 hours while maintaining this temperature, followed by cooling, thereby obtaining a water dispersion of acrylic urethane composite resin particles (A3-1) having a mass solids concentration of 40%.

The average particle diameter of the obtained acrylic urethane composite resin particles (A3-1) was 350 nm (as measured at 20° C. using a "COULTER N4" submicron particle size distribution analyzer (produced by Beckman Coulter, Inc.) in a state diluted with deionized water), the viscosity was 200 mPa·s (B-type viscometer, 60 rpm, 23° C.), the hydroxyl value was 22 mgKOH/g, and the acid value was 12 mgKOH/g.

Production Example 9

A water dispersion of acrylic urethane composite resin particles (A3-2) having a mass solids concentration of 40% was obtained in the same manner as in Production Example 8, except that the amount of dimethylethanolamine as the neutralizing amine was reduced to 0.6 parts.

The average particle diameter of the obtained acrylic urethane composite resin particles (A3-2) was 530 nm (as measured at 20° C. using a "COULTER N4" submicron particle size distribution analyzer (produced by Beckman Coulter, Inc.) in a state diluted with deionized water), the viscosity was 110 mPa·s (B-type viscometer, 60 rpm, 23° C.), the hydroxyl value was 22 mgKOH/g, and the acid value was 12 mgKOH/g.

Production Example 10

A water dispersion of acrylic urethane composite resin particles (A3-3) having a mass solids concentration of 40% was obtained in the same manner as in Production Example 8, except that "ETERNACOLL UH-100" (trade name, produced by Ube Industries, Ltd.; 1,6-hexanediol-based polycarbonatediol, molecular weight: about 1000) was used in place of "PTMG-1000."

The average particle diameter of the obtained acrylic urethane composite resin particles (A3-3) was 310 nm (as measured at 20° C. using a "COULTER N4" submicron particle size distribution analyzer (produced by Beckman Coulter, Inc.) in a state diluted with deionized water), the viscosity was 60 mPa·s (B-type viscometer, 60 rpm, 23° C.), the hydroxyl value was 22 mgKOH/g, and the acid value was 12 mgKOH/g.

Production Example 11

32.2 parts of "PTMG-1000" (trade name, produced by Mitsubishi Chemical Corporation; polytetramethylene ether glycol, molecular weight: about 1000), 2.9 parts of dimethylolpropionic acid, 14 parts of n-butyl acrylate, 30.5 parts of 2-ethylhexyl acrylate, 0.01 part of butylhydroxytoluene, and 0.1 part of "Neostann U-600" were placed in a reactor equipped with a thermometer, a thermostat, a stirrer, and a reflux condenser. After the temperature was increased to 90° C., 13.3 parts of isophorone diisocyanate was added dropwise over 30 minutes. Thereafter, the temperature was maintained at 90° C., and the reaction was continued until the NCO value was 11 mg/g or less. Further, 3.5 parts of 2-hydroxyethyl methacrylate was added, and the reaction was continued until the NCO value was 1 mg/g or less, followed by cooling to room temperature. 1 part of allyl methacrylate was added to the reaction product to thereby obtain a polyurethane resin containing a terminal unsaturated double bond diluted with an acrylic monomer. The acid value of the obtained polyurethane resin was 24 mgKOH/g, the hydroxyl value was 0 mgKOH/g, and the weight average molecular weight was 28000.

1.1 part of dimethylethanolamine as a neutralizing amine was added to the polyurethane resin containing a terminal unsaturated double bond diluted with an acrylic monomer, and phase-inversion emulsification was performed using 143 parts of deionized water at room temperature. The mixture was heated to 70° C. while stirring, and an initiator solution prepared by dissolving 0.1 part of "VA-057" in 4 parts of deionized water was added dropwise to the flask over 30 minutes. Further, an initiator solution prepared by dissolving 0.05 parts of "VA-057" in 2 parts of deionized water was placed in the flask, and the mixture was stirred for 2 hours while maintaining this temperature, followed by cooling, thereby obtaining a water dispersion of acrylic urethane composite resin particles (A3-4) having a mass solids concentration of 40%.

The average particle diameter of the obtained acrylic urethane composite resin particles (A3-4) was 330 nm (as measured at 20° C. using a "COULTER N4" submicron particle size distribution analyzer (produced by Beckman Coulter, Inc.) in a state diluted with deionized water), the viscosity was 90 mPa·s (B-type viscometer, 60 rpm, 23° C.), the hydroxyl value was 9 mgKOH/g, and the acid value was 12 mgKOH/g.

Production Example 12

35.9 parts of "PTMG-1000" (trade name, produced by Mitsubishi Chemical Corporation; polytetramethylene ether glycol, molecular weight: about 1000), 2.8 parts of dimethylolpropionic acid, 7 parts of n-butyl acrylate, 22 parts of 2-ethylhexyl acrylate, 0.01 part of butylhydroxytoluene, and 0.1 part of "Neostann U-600" were placed in a reactor equipped with a thermometer, a thermostat, a stirrer, and a reflux condenser. After the temperature was increased to 90° C., 11.3 parts of isophorone diisocyanate was added dropwise over 30 minutes. Thereafter, the temperature was maintained at 90° C., and the reaction was continued until the NCO value was 1 mg/g or less, followed by cooling to room temperature. 1 part of allyl methacrylate was added to the reaction product to thereby obtain a hydroxy-containing polyurethane resin diluted with an acrylic monomer. The acid value of the obtained polyurethane resin was 24 mgKOH/g, the hydroxyl value was 14 mgKOH/g, and the weight average molecular weight was 25000.

1.1 part of dimethylethanolamine as a neutralizing amine was added to the hydroxy-containing polyurethane resin diluted with an acrylic monomer, and phase-inversion emulsification was performed using 128 parts of deionized water at room temperature. After the mixture was heated to 70° C. while stirring, an initiator solution prepared by dissolving 0.06 parts of "VA-057" in 2.4 parts of deionized water was added dropwise to the flask over 30 minutes, and the mixture was stirred for 2 hours while maintaining this temperature. Thereafter, a product obtained by dissolving a monomer emulsion having the following composition and 0.04 parts of "VA-057" in 1.6 parts of deionized water was added dropwise over 1.5 hours, and the mixture was stirred for 1 hour while maintaining this temperature. Further, an initiator solution prepared by dissolving 0.05 parts of "VA-057" in 2 parts of deionized water was placed in the flask, and the mixture was stirred for 2 hours while maintaining this temperature, followed by cooling, thereby obtaining a water dispersion of acrylic urethane composite resin particles (A3-5) having a mass solids concentration of 40%.

| Monomer emulsion composition | |
| --- | --- |
| 2-Ethylhexyl acrylate | 8 parts |
| n-Butyl acrylate | 7 parts |
| 2-Hydroxyethyl methacrylate | 3.5 parts |
| Acrylic acid | 0.5 parts |
| Allyl methacrylate | 1 part |
| "Newcol 707SF" | 2.0 parts |
| Deionized water | 15 parts |

The average particle diameter of the obtained acrylic urethane composite resin particles (A3-5) was 400 nm (as measured at 20° C. using a "COULTER N4" submicron particle size distribution analyzer (produced by Beckman Coulter, Inc.) in a state diluted with deionized water), the viscosity was 160 mPa·s (B-type viscometer, 60 rpm, 23° C.), the hydroxyl value was 22 mgKOH/g, and the acid value was 16 mgKOH/g.

Production Example 13

33.1 part of "PTMG-1000" (trade name, produced by Mitsubishi Chemical Corporation; polytetramethylene ether glycol, molecular weight: about 1000), 2.9 parts of dimethylolpropionic acid, 14 parts of n-butyl acrylate, 30.5 parts of 2-ethylhexyl acrylate, 0.01 part of butylhydroxytoluene, and 0.1 part of "Neostann U-600" were placed in a reactor equipped with a thermometer, a thermostat, a stirrer, and a reflux condenser. After the temperature was increased to 90° C., 13.6 parts of isophorone diisocyanate was added dropwise over 30 minutes. Thereafter, the temperature was maintained at 90° C., and the reaction was continued until the NCO value was 11 mg/g or less, followed by cooling to room temperature. 3.5 parts of 2-ethylhexyl methacrylate and 1 part of allyl methacrylate were added to the reaction product at room temperature, thereby obtaining a terminal isocyanate group-containing polyurethane resin. The acid value of the obtained polyurethane resin was 25 mgKOH/g, the hydroxyl value was 0 mgKOH/g, and the weight average molecular weight was 26000.

1.1 part of dimethylethanolamine as a neutralizing amine was added to the polyurethane resin containing a terminal isocyanate group diluted with an acrylic monomer, and phase-inversion emulsification was performed using 143 parts of deionized water at room temperature. Further, 0.4 parts of ethylenediamine as a chain extender was added, and the mixture was heated to 40° C. while stirring, and reacted for 2 hours. The mixture was then heated to 70° C. while stirring, and an initiator solution prepared by dissolving 0.1 part of "VA-057" in 4 parts of deionized water was added dropwise to the flask over 30 minutes. While maintaining this temperature, the mixture was stirred for 2 hours. Further, an initiator solution prepared by dissolving 0.05 parts of "VA-057" in 2 parts of deionized water was placed in the flask, and the mixture was stirred for 2 hours while maintaining this temperature, followed by cooling, thereby obtaining a water dispersion of acrylic urethane composite resin particles (A3-6) having a mass solids concentration of 40%.

The average particle diameter of the obtained acrylic urethane composite resin particles (A3-6) was 350 nm (as measured at 20° C. using a "COULTER N4" submicron particle size distribution analyzer (produced by Beckman Coulter, Inc.) in a state diluted with deionized water), the viscosity was 150 mPa·s (B-type viscometer, 60 rpm, 23° C.), the hydroxyl value was 15 mgKOH/g, and the acid value was 12 mgKOH/g.

Production Example 14

A water dispersion of acrylic urethane composite resin particles (A3-7) having a mass solids concentration of 40% was obtained in the same manner as in Production Example 8, except that the amount of dimethylethanolamine as the neutralizing amine was increased to 1.7 parts.

The average particle diameter of the obtained acrylic urethane composite resin particles (A3-7) was 170 nm (as measured at 20° C. using a "COULTER N4" submicron particle size distribution analyzer (produced by Beckman Coulter, Inc.) in a state diluted with deionized water), the viscosity was 890 mPa·s (B-type viscometer, 60 rpm, 23° C.), the hydroxyl value was 22 mgKOH/g, and the acid value was 12 mgKOH/g.

The acrylic resin particles (A1-3) of Production Example 3, the urethane resin particles (A2-4) of Production Example 7, and the acrylic urethane composite resin particles (A3-7) of Production Example 14 are resin particles for Comparative Examples.

Production of Pigment Dispersion Resin (Hydroxy-Containing Polyester Resin (E))

Production Example 15

174 parts of trimethylolpropane, 327 parts of neopentyl glycol, 352 parts of adipic acid, 109 parts of isophthalic acid, and 101 part of 1,2-cyclohexanedicarboxylic acid anhydride were placed in a reactor equipped with a thermometer, a thermostat, a stirrer, a reflux condenser, and a water separator. After the temperature was increased from 160° C. to 230° C. over 3 hours, the mixture was maintained at 230° C. while removing the generated condensed water by the water separator, and the reaction was continued until the acid value was 3 mgKOH/g or less. 59 parts of trimellitic anhydride was added to the reaction product, and an addition reaction was performed at 170° C. for 30 minutes. Then, the reactant was cooled to 50° C. or less, 2-(dimethylamino)ethanol equivalent to the acid groups was added for neutralization, and deionized water was gradually added, thereby obtaining a hydroxy-containing polyester resin (E) solution having a solids concentration of 45% and a pH of 7.2. The acid value of the obtained hydroxy-containing polyester resins was 35 mgKOH/g, the hydroxyl value was 128 mgKOH/g, and the number average molecular weight was 1500.

Production of Aqueous Coating Composition

Example 1

22.2 parts (resin solids content: 10 parts) of the hydroxy-containing polyester resin (E) solution obtained in Production Example 15, 60 parts of "JR-806" (trade name, produced by Tayca Corporation; rutile titanium dioxide), 1 part of "Carbon MA-100" (trade name, produced by Mitsubishi Chemical Corporation; carbon black), 15 parts of "Bariace B-35" (trade name, produced by Sakai Chemical Industry Co., Ltd.; barium sulfate powder, average primary particle diameter: 0.5 μm), and 5 parts of deionized water were mixed. After the pH of the mixture was adjusted to 8.0 using 2-(dimethylamino)ethanol, the mixture was dispersed by a paint shaker for 30 minutes, thereby obtaining a pigment dispersion paste.

Next, 103.2 parts of the obtained pigment dispersion paste, 83.3 parts (resin solids content: 25 parts) of the acrylic resin particle (A1-1) dispersion obtained in Production Example 1, 25 parts (resin solids content: 10 parts) of the urethane resin particle (A2-2) dispersion obtained in Production Example 5, 7.5 parts of polyoxyalkylene group-containing polyol (B1) (polyoxypropylene glycol, number average molecular weight: 400), 7.5 parts of a diester compound (C1) (a diester compound of polyoxyethylene glycol and 2-ethylpentanoic acid. In Formula (1), $R^1$ is $C_6$ branched alkyl, $R^2$ is ethylene, and m is 7. Molecular weight: 536), 26.3 parts (resin solids content: 10 parts) of a cross-linking agent (D1) (Bayhydur VPLS2310 (trade name, produced by Sumika Bayer Urethane Co., Ltd.; an oxime blocked polyisocyanate compound, solids content: 38%)), and 37.5 parts (resin solids content: 30 parts) of a cross-linking agent (D2) (methyl-butyl mixed etherified melamine resin, solids content: 80%, weight average molecular weight: 800) were uniformly mixed.

Subsequently, "UH-752" (trade name, produced by ADEKA; a urethane associated thickener), 2-(dimethylamino)ethanol, and deionized water were added to the obtained mixture, thereby obtaining an aqueous coating composition No. 1 having a pH of 8.0, a mass solids concentration of 56%, and a viscosity of 45 seconds measured at 20° C. using Ford Cup No. 4.

Examples 2 to 23 and Comparative Examples 1 to 5

Aqueous coating composition Nos. 2 to 28 each having a pH of 8.0 and a viscosity of 45 seconds measured at 20° C. using Ford Cup No. 4 were obtained in the same manner as in Example 1, except that the formulation of Example 1 was changed as shown in Table 1 below.

The composition ratio of Table 1 is the solids content ratio, and the aqueous coating composition Nos. 24 to 28 are Comparative Examples.

The polyoxyalkylene group-containing polyols (B) and the diester compounds (C) shown in Table 1 are as follows.

Polyoxyalkylene group-containing polyol (B2): polyoxypropylene glycol, number average molecular weight: 1000

Polyoxyalkylene group-containing polyol (B3): polyoxypropylene glyceryl ether, number average molecular weight: 600

Polyoxyalkylene group-containing polyol (B4): polyoxypropylene glyceryl ether, number average molecular weight: 1000

Polyoxyalkylene group-containing polyol (B5): polyoxypropylene glyceryl ether, number average molecular weight: 1500

Polyoxyalkylene group-containing polyol (B6): polyoxypropylene glyceryl ether, number average molecular weight: 3000

Diester compound (C2): a diester compound of polyoxyethylene glycol and 2-ethylhexanoic acid. In Formula (1), $R^1$ is $C_7$ branched alkyl, $R^2$ is ethylene, and m is 7. Molecular weight: 578.

Diester compound (C3): a diester compound of polyoxyethylene glycol and 2-ethylheptanoic acid. In Formula (1), $R^1$ is $C_8$ branched alkyl, $R^2$ is ethylene, and m is 7. Molecular weight: 606.

Diester compound (C4): a diester compound of polyoxyethylene glycol and 2-ethyloctanoate. In Formula (1), $R^1$ is $C_9$ branched alkyl group, $R^2$ is ethylene, and m is 10. Molecular weight: 766.

The following evaluation tests were conducted for the aqueous coating composition Nos. 1 to 28 obtained in Examples 1 to 23 and Comparative Examples 1 to 5. Table 1 below also shows the evaluation results.

Test plates were produced in the following manner, and evaluated for the finished appearance (smoothness and distinctness of image), chipping resistance, storage stability, and sagging resistance.

(Production of Test Substrate)

"ELECRON GT-10" (trade name, produced by Kansai Paint Co., Ltd.; a cationic electrodeposition coating composition) was applied by electrodeposition to a cold-rolled steel plate treated with zinc phosphate to a dry film thickness of 20 μm, and cured by heating at 170° C. for 30 minutes, thereby preparing a test substrate.

(Production of Test Plate)

Each aqueous coating composition as an intermediate coating composition was individually electrostatically applied to the test substrates to a film thickness of 25 μm (when cured) using a rotary atomizing electrostatic coating apparatus at 27° C. at a relative humidity of 50%, and allowed to stand for 5 minutes, followed by preheating at 80° C. for 3 minutes. Then, "WBC-713T No. 1F7" (trade name, produced by Kansai Paint Co., Ltd.; an acrylic melamine resin-based aqueous base coating composition, coating color: silver) was electrostatically applied to the uncured intermediate coating films to a film thickness of 15 μm (when cured) using a rotary atomizing electrostatic coating apparatus, and allowed to stand for 5 minutes, followed by preheating at 80° C. for 3 minutes.

Subsequently, "Magicron KINO-1210" (trade name, produced by Kansai Paint Co., Ltd.; an acrylic resin solvent-based top clear coating composition) was electrostatically applied to the uncured base coating films to a film thickness of 35 μm (when cured), and allowed to stand for 7 minutes, followed by heating at 140° C. for 30 minutes to cure the multilayer coating film comprising an intermediate coating film, a base coating film, and a clear coating film. Thus, the test plates were produced.

(Production of Test Plate for Sagging Resistance)

Further, test plates for sagging resistance were separately produced in the following manner.

Used herein were 11 cm×45 cm substrates on which, at a distance 3 cm away from the edge of the longitudinal side of the substrates, 14 punch holes having a diameter of 5 mm were placed in a row at 3-cm intervals. Each aqueous coating composition was applied to each of the substrates at 20° C. at a relative humidity of 83% with a film thickness gradient in the longitudinal direction, and the coated plates were allowed to stand almost vertically for 5 minutes. Then, the coated plates were preheated for 10 minutes at 80° C., and further dried by heating for 30 minutes at 140° C., thereby producing test plates for sagging resistance.

The test method and the evaluation method are as follows.

Finished Appearance

Smoothness: Smoothness was evaluated based on the Wc values measured using "Wave Scan DOI" (trade name, produced by BYK Gardner Co.). The Wc value is an index of the amplitude of surface roughness at a wavelength of about 1 to 3 mm. A smaller measured value indicates a higher smoothness of the coated surface.

Distinctness of image: Distinctness of image was evaluated based on the Wb values measured using "wave Scan DOI" (trade name, produced by BYK Gardner Co.). The Wb value is an index of the amplitude of surface roughness at a wavelength of about 0.3 to 1 mm. A smaller measured value indicates a higher distinctness of image of the coated surface.

Chipping Resistance: Each test plate was placed on a sample holder of a "JA-400" flying stone chipping tester (a chipping test device) produced by Suga Test Instruments Co., Ltd., and 100 g of crushed granite of No. 6 particle size was blown onto the test plate at an angle of 45° with compressed air at 0.392 MPa (4 kgf/cm²), at a distance of 30 cm from the test plate, and at a temperature of −20° C. Subsequently, the resulting test plate was washed with water and dried, and cloth adhesive tape (produced by Nichiban Co., Ltd.) was applied to the coating surface. After peeling off the tape, the occurrence of scratches formed on the coating film was visually observed and evaluated according to the following criteria.

S: Size of scratches was extremely small, and the electrodeposition surface and the substrate steel plate were not exposed.

A: Size of scratches was small, and the electrodeposition surface and the substrate steel plate were not exposed.

B: Size of scratches was small, but the electrodeposition surface and the substrate steel plate were exposed.

C. Size of scratches was considerably large, and the substrate steel plate was also largely exposed.

Storage stability: Test plates were produced in the same manner using each of the coating compositions stored at 30° C. for 30 days after production, and their distinctness of image was evaluated to evaluate storage stability.

Sagging resistance: The obtained test plates were each examined to determine the portions where 2-mm sagging of the coating composition was observed from the lower end of each of the punch holes. The sagging resistance was evaluated by measuring the film thickness (sagging limit thickness (μm)) at the above portions. The larger the sagging limit thickness, the better the sagging resistance.

TABLE 1

Table 1 (i)

| | | | | Example | | | | | | | | | | | | |
|---|---|---|---|---|---|---|---|---|---|---|---|---|---|---|---|---|
| | | | | 1 | 2 | 3 | 4 | 5 | 6 | 7 | 8 | 9 | 10 | 11 | 12 | 13 | 14 |
| Pigment paste | Aqueous coating composition No. | | | 1 | 2 | 3 | 4 | 5 | 6 | 7 | 8 | 9 | 10 | 11 | 12 | 13 | 14 |
| | Hydroxy-containing polyester resin (E) | | | 10 | 10 | 10 | 10 | 10 | 10 | 10 | 10 | 10 | 10 | 10 | 10 | 10 | 10 |
| | Pigment | Color pigment | JR-806 | 60 | 60 | 60 | 60 | 60 | 60 | 60 | 60 | 60 | 60 | 60 | 60 | 60 | 60 |
| | | | MA-100 | 1 | 1 | 1 | 1 | 1 | 1 | 1 | 1 | 1 | 1 | 1 | 1 | 1 | 1 |
| | | Extender pigment | Bariace B-35 | 15 | 15 | 15 | 15 | 15 | 15 | 15 | 15 | 15 | 15 | 15 | 15 | 15 | 15 |
| A | Resin particles | Acrylic resin particles A1 | A1-1 600 nm | 25 | | | | | | | | | | | | | |
| | | | A1-2 900 nm | | 25 | | | | | | | | | | | | |
| | | | A1-3 200 nm | | | 25 | 25 | | | | | | | | | 25 | 25 |
| | | Urethane resin particles A2 | A2-1 330 nm | 10 | 10 | 10 | | | | | | | | | | | |
| | | | A2-2 520 nm | | | | 10 | | | | | | | | | | |
| | | | A2-3 320 nm | | | | | 20 | | | | | | | | | |
| | | | A2-4 250 nm | | | | | | | | | | | | | | 10 |
| | | Acrylic urethane composite resin particles A3 | A3-1 350 nm | | | | | | 20 | | | | | | | 10 | |
| | | | A3-2 530 nm | | | | | | | 20 | | | | | 35 | | |
| | | | A3-3 310 nm | | | | | | | | 20 | | | | | | |
| | | | A3-4 330 nm | | | | | | | | | 20 | | | | | |
| | | | A3-5 400 nm | | | | | | | | | | 20 | | | | |
| | | | A3-6 350 nm | | | | | | | | | | | 20 | | | |
| | | | A3-7 170 nm | | | | | | | | | | | | | | |
| B | Polyoxyalkylene group-containing polyol | | B1 Mn = 400 | 7.5 | 7.5 | 7.5 | 7.5 | 7.5 | 7.5 | 7.5 | 7.5 | 7.5 | 7.5 | 7.5 | 7.5 | 15 | 15 |
| | | | B2 Mn = 1000 | | | | | | | | | | | | | | |
| | | | B3 Mn = 600 | | | | | | | | | | | | | | |
| | | | B4 Mn = 1000 | | | | | | | | | | | | | | |
| | | | B5 Mn = 1500 | | | | | | | | | | | | | | |
| | | | B6 Mn = 3000 | | | | | | | | | | | | | | |
| C | Diester compound | | C1 | 7.5 | 7.5 | 7.5 | 7.5 | 7.5 | 7.5 | 7.5 | 7.5 | 7.5 | 7.5 | 7.5 | 7.5 | | |
| | | | C2 | | | | | | | | | | | | | | |
| | | | C3 | | | | | | | | | | | | | | |
| | | | C4 | | | | | | | | | | | | | | |
| D | Crosslinking agent | | D1 | 10 | 10 | 10 | 10 | 10 | 10 | 10 | 10 | 10 | 10 | 10 | 10 | 10 | 10 |
| | | | D2 | 30 | 30 | 30 | 30 | 30 | 30 | 30 | 30 | 30 | 30 | 30 | 30 | 30 | 30 |
| | (B + C)/(A + B + C + D) % | | | 17% | 17% | 17% | 17% | 17% | 17% | 17% | 17% | 17% | 17% | 17% | 17% | 17% | 17% |
| | Mass solids concentration % | | | 56 | 57 | 55 | 57 | 53 | 53 | 55 | 53 | 53 | 54 | 53 | 55 | 56 | 56 |
| | Finished appearance | Smoothness Wc | | 8.9 | 6.7 | 7.2 | 6.5 | 6.2 | 7.1 | 7.4 | 8.5 | 7.9 | 7.2 | 7.4 | 7 | 7.4 | 8.8 |
| | | Distinctness of image Wb | | 13.5 | 12.8 | 14.0 | 12.4 | 12.4 | 12.6 | 13 | 12.8 | 13.2 | 13.5 | 12.9 | 13.3 | 13.5 | 12.2 |
| | Chipping resistance | | | A | A | A | A | A | A | A | A | A | A | A | A | A | A |
| | Storage stability | | | 16.0 | 14.8 | 16.1 | 13.9 | 15 | 14.5 | 15.1 | 15.6 | 15.9 | 16.2 | 14.1 | 15.6 | 15.8 | 14.9 |
| | Sagging resistance: sagging limit thickness (μm) | | | 47 | 49 | 45 | 48 | 44 | 44 | 46 | 44 | 43 | 46 | 44 | 46 | 45 | 47 |

TABLE 2

Table 1 (ii)

| | | | 15 | 16 | 17 | 18 | 19 | 20 | 21 | 22 | 23 | Comparative Example 1 | 2 | 3 | 4 | 5 |
|---|---|---|---|---|---|---|---|---|---|---|---|---|---|---|---|---|
| Pigment paste | Aqueous coating composition No. | | 15 | 16 | 17 | 18 | 19 | 20 | 21 | 22 | 23 | 24 | 25 | 26 | 27 | 28 |
| | Hydroxy-containing polyester resin (E) | | 10 | 10 | 10 | 10 | 10 | 10 | 10 | 10 | 10 | 10 | 10 | 10 | 10 | 10 |
| | Pigment | Color pigment JR-806 | 60 | 60 | 60 | 60 | 60 | 60 | 60 | 60 | 60 | 60 | 60 | 60 | 60 | 60 |
| | | MA-100 | 1 | 1 | 1 | 1 | 1 | 1 | 1 | 1 | 1 | 1 | 1 | 1 | 1 | 1 |
| | | Extender pigment Bariace B-35 | 15 | 15 | 15 | 15 | 15 | 15 | 15 | 15 | 15 | 15 | 15 | 15 | 15 | 15 |
| A Resin particles | Acrylic resin particles A1 | A1-1 600 nm | 20 | 20 | 25 | 25 | 25 | 25 | 25 | 25 | 25 | 25 | | 25 | 30 | 25 |
| | | A1-2 900 nm | | | | | | | | | | | 15 | | | |
| | | A1-3 200 nm | | | | | | | | | | | | | | |
| | Urethane resin particles A2 | A2-1 330 nm | 10 | 10 | 10 | | 10 | 10 | 10 | 10 | 10 | | | 10 | | |
| | | A2-2 520 nm | | | | | | | | | | | | | 16 | |
| | | A2-3 320 nm | | | | | | | | | | | | | | |
| | | A2-4 250 nm | | | | | | | | | | 10 | | | | |
| | Acrylic urethane composite resin A3 | A3-1 350 nm | | | | | | | | | | | | | | |
| | | A3-2 530 nm | | | | | | | | | | | | | | |
| | | A3-3 310 nm | | | | | | | | | | | | | | |
| | | A3-4 330 nm | | | | | | | | | | | | | | |
| | | A3-5 400 nm | | | | | | | | | | | | | | |
| | | A3-6 350 nm | | | | | | | | | | | | | | |
| | | A3-7 170 nm | | | | | | | | | | | | | | |
| B | Polyoxyalkylene group-containing polyol | B1 Mn = 400 | 10 | 5 | | | | | | | | | 20 | | | |
| | | B2 Mn = 1000 | | | 7.5 | | | | | | | | | | | |
| | | B3 Mn = 600 | | | | 7.5 | | | | | | | | | | |
| | | B4 Mn = 1000 | | | | | 7.5 | | | | | | | | | |
| | | B5 Mn = 1500 | | | | | | 7.5 | | | | | | | | |
| | | B6 Mn = 3000 | | | | | | | 7.5 | 7.5 | 7.5 | 7.5 | 7.5 | | 2 | 12.5 |
| C | Diester compound | C1 | 10 | 15 | 7.5 | 7.5 | 7.5 | 7.5 | | | | 7.5 | 7.5 | | | 12.5 |
| | | C2 | | | | | | | 7.5 | | | | | | | |
| | | C3 | | | | | | | | 7.5 | | | | | | |
| | | C4 | | | | | | | | | 7.5 | | | 7.5 | | |
| D | Crosslinking agent | D1 | | | | | | | | | | | | | | |
| | | D2 | | | | | | | | | | | | | 2 | |
| | (B + C)/(A + B + C + D) % | | 22% | 22% | 17% | 17% | 17% | 17% | 17% | 17% | 17% | 17% | 17% | 17% | 4% | 28% |
| | Mass solids concentration % | | 56 | 56 | 56 | 56 | 56 | 55 | 56 | 56 | 56 | 47 | 48 | 54 | 56 | 56 |
| | Finished appearance | Smoothness Wc | 8.1 | 7.4 | 6.7 | 7.5 | 7.2 | 8.3 | 7.2 | 7.3 | 6.8 | 12.4 | 13.1 | 11.1 | 15.4 | 7.2 |
| | | Distinctness of image Wb | 12.1 | 14.1 | 12.3 | 13.9 | 13.4 | 14.1 | 12.5 | 13.1 | 13.1 | 17 | 15.8 | 15.9 | 16.3 | 16.3 |
| | Chipping resistance | | A | A | A | A | A | A | A | A | A | A | A | A | A | A |
| | Storage stability | | A | A | A | A | A | A | A | A | A | A | A | A | A | C |
| | Sagging resistance: sagging limit thickness (μm) | | 15.1 / 46 | 15.9 / 46 | 14.5 / 47 | 16.4 / 46 | 15.8 / 48 | 16.2 / 46 | 14.8 / 49 | 14.4 / 49 | 15.1 / 48 | 20.0 / 32 | 19.2 / 34 | 19.4 / 46 | 19.7 / 45 | 20.1 / 45 |

INDUSTRIAL APPLICABILITY

The aqueous coating composition of the present invention is suitable for coating of various industrial products, such as industrial machines, construction machines, steel furniture and closets, automobile exterior panels, and automobile components.

The invention claimed is:

1. An aqueous coating composition comprising resin particles (A) having an average particle diameter of 300 to 1000 nm, a polyoxyalkylene group-containing polyol (B) having a number average molecular weight of 300 to 2000, a diester compound (C), and a crosslinking agent (D);
    wherein the diester compound (C) is represented by the following Formula (1):

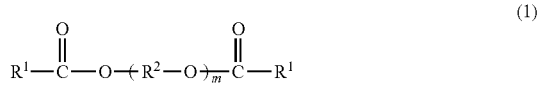

(1)

wherein two $R^1$ are $C_4$-$C_{18}$ hydrocarbon groups that may be the same or different, $R^2$ is a $C_2$-$C_4$ linear or branched alkylene group, m is an integer of 3 to 25, and m oxyalkylene units ($R^2$—O) may be the same or different; and
    the total solids content of the polyoxyalkylene group-containing polyol (B) and the diester compound (C) is 5 to 25 mass % based on the total solids content of the resin particles (A), the polyoxyalkylene group-containing polyol (B), the diester compound (C), and the crosslinking agent (D).

2. The aqueous coating composition according to claim 1, wherein the resin particles (A) are at least one member selected from the group consisting of acrylic resin particles (A1), urethane resin particles (A2), and acrylic urethane composite resin particles (A3).

3. The aqueous coating composition according to claim 1, wherein the total solids content of the resin particles (A) is 15 to 50 mass % based on the total solids content of the resin particles (A), the polyoxyalkylene group-containing polyol (B), the diester compound (C), and the crosslinking agent (D).

4. An article having a coating film of the aqueous coating composition according to claim 1.

5. A method for forming a coating film, the method comprising applying the aqueous coating composition according to claim 1 to a substrate.

6. A method for forming a multilayer coating film, the method comprising:
    (1) applying the aqueous coating composition according to claim 1 to a substrate to form a first base coating film;
    (2) applying an aqueous base coating composition to the uncured first base coating film to form a second base coating film;
    (3) applying a clear coating composition to the uncured second base coating film to form a clear coating film; and
    (4) simultaneously curing the uncured first base coating film, second base coating film, and clear coating film by heating.

7. The aqueous coating composition according to claim 2, wherein the total solids content of the resin particles (A) is 15 to 50 mass % based on the total solids content of the resin particles (A), the polyoxyalkylene group-containing polyol (B), the diester compound (C), and the crosslinking agent (D).

8. An article having a coating film of the aqueous coating composition according to claim 2.

9. An article having a coating film of the aqueous coating composition according to claim 3.

10. An article having a coating film of the aqueous coating composition according to claim 7.

11. A method for forming a coating film, the method comprising applying the aqueous coating composition according to claim 2 to a substrate.

12. A method for forming a coating film, the method comprising applying the aqueous coating composition according to claim 3 to a substrate.

13. A method for forming a coating film, the method comprising applying the aqueous coating composition according to claim 7 to a substrate.

14. A method for forming a multilayer coating film, the method comprising:
    (1) applying the aqueous coating composition according to claim 2 to a substrate to form a first base coating film;
    (2) applying an aqueous base coating composition to the uncured first base coating film to form a second base coating film;
    (3) applying a clear coating composition to the uncured second base coating film to form a clear coating film; and
    (4) simultaneously curing the uncured first base coating film, second base coating film, and clear coating film by heating.

15. A method for forming a multilayer coating film, the method comprising:
    (1) applying the aqueous coating composition according to claim 3 to a substrate to form a first base coating film;
    (2) applying an aqueous base coating composition to the uncured first base coating film to form a second base coating film;
    (3) applying a clear coating composition to the uncured second base coating film to form a clear coating film; and
    (4) simultaneously curing the uncured first base coating film, second base coating film, and clear coating film by heating.

16. A method for forming a multilayer coating film, the method comprising:
    (1) applying the aqueous coating composition according to claim 7 to a substrate to form a first base coating film;
    (2) applying an aqueous base coating composition to the uncured first base coating film to form a second base coating film;
    (3) applying a clear coating composition to the uncured second base coating film to form a clear coating film; and
    (4) simultaneously curing the uncured first base coating film, second base coating film, and clear coating film by heating.

* * * * *